(12) United States Patent
Wright

(10) Patent No.: US 8,635,101 B2
(45) Date of Patent: Jan. 21, 2014

(54) APPARATUS AND METHOD FOR A FINANCIAL PLANNING FAITH-BASED RULES DATABASE

(76) Inventor: Daphne A. Wright, Sterling, VA (US)

( * ) Notice: Subject to any disclaimer, the term of this patent is extended or adjusted under 35 U.S.C. 154(b) by 1136 days.

(21) Appl. No.: 12/219,386

(22) Filed: Jul. 21, 2008

(65) Prior Publication Data

US 2009/0106136 A1 Apr. 23, 2009

Related U.S. Application Data

(60) Provisional application No. 60/935,002, filed on Jul. 20, 2007.

(51) Int. Cl.
*G06Q 40/00* (2012.01)
(52) U.S. Cl.
USPC .............. 705/10; 705/35; 705/36 R; 705/37
(58) Field of Classification Search
USPC ...................... 705/10, 35, 36 R, 37
See application file for complete search history.

(56) References Cited

U.S. PATENT DOCUMENTS

| 7,356,497 B1 * | 4/2008 | Bursey et al. ............... 705/36 R |
| 2002/0156710 A1 * | 10/2002 | Ryder ............................. 705/35 |
| 2004/0068429 A1 * | 4/2004 | MacDonald .................... 705/10 |
| 2005/0267836 A1 * | 12/2005 | Crosthwaite et al. .......... 705/37 |
| 2006/0218068 A1 * | 9/2006 | Loeper ........................... 705/35 |

OTHER PUBLICATIONS

The Bible, American Standard Version, updated english language version, in html format, with html name (hyperlink) name tags for each verse.The Book of Luke . . . www.awitness.org/biblehtm/lu/lu16.htm—Cached—Similar) ,1995.*
Crown Financial Ministries, http://www.crown.org/.*
Ron Blue, http://www.mastermoney.org/.*

* cited by examiner

*Primary Examiner* — Charles Kyle
*Assistant Examiner* — Siegfried E Chencinski
(74) *Attorney, Agent, or Firm* — Doster Greene, LLC

(57) ABSTRACT

A method for providing financial management and planning in an electronic device according to various exemplary embodiments can include using a faith-based rules database to determine a financial and life purposed plan for a user; draft a vision statement for the user based on the financial and life purposed plan; establish personal goals and priorities based on the vision statement for the user; compile financial statement and reports for the user based on financial data of the user; generate a stewardship evaluation report that provides an analysis of management of finances by the user based on faith-based financial management rules and the purposed plan; develop financial plans for the user based on results of the stewardship evaluation report; prepare a spending and savings plan for the user to facilitate the financial plans; and iteratively monitoring and revising the steps of determining, drafting, establishing, compiling, generating, developing and preparing financial plans.

20 Claims, 47 Drawing Sheets

400
FIG. 4A

WEEKLY SPENDING REPORT

Monday, _____ 200___ through Sunday, _____ 200___

| | MON | TUES | WED | THURS | FRI | SAT | SUN | Weekly Total |
|---|---|---|---|---|---|---|---|---|
| Gas | | | | | | | | $ - |
| Eating Out | | | | | | | | $ - |
| Snacks and Drinks | | | | | | | | $ - |
| Gas | | | | | | | | $ - |
| Tolls/Public Transportation | | | | | | | | $ - |
| Barber/Beauty | | | | | | | | $ - |
| Kids Allowance | | | | | | | | $ - |
| Kids Activity Expenses | | | | | | | | $ - |
| Tips for Services | | | | | | | | $ - |
| Food Groceries | | | | | | | | $ - |
| Household Groceries | | | | | | | | $ - |
| Entertainment | | | | | | | | $ - |
| _____ | | | | | | | | $ - |
| _____ | | | | | | | | $ - |
| _____ | | | | | | | | $ - |
| _____ | | | | | | | | $ - |
| _____ | | | | | | | | $ - |
| _____ | | | | | | | | $ - |
| _____ | | | | | | | | $ - |
| _____ | | | | | | | | $ - |
| _____ | | | | | | | | $ - |
| _____ | | | | | | | | $ - |
| TOTAL | $ - | $ - | $ - | $ - | $ - | $ - | $ - | $ - |

400
FIG. 4B

Monthly Income and Expenditure Analysis

| My Incoming Provision | $ |
|---|---|
| Wages/Salary 1 | $ - |
| Wages/Salary 2 | |
| Part-Time Work | |
| Self-Employment | |
| Bonus/Overtime/Tips | |
| Child Support | |
| Pension | |
| Social Security | |
| Other ( ) | |
| Other ( ) | |
| Total Monthly Provision | $ - |

My Expenditures

| | $ |
|---|---|
| Mortgage/rent | $ - |
| Home Owner Association/Condo Fees | |
| HOME & HOUSEHOLD MAINTENANCE | |
| Gas/Electric | |
| Electric | |
| Water/sewer | |
| Trash Collection | |
| Phone | |
| Cable/satellite | |
| Security Monitoring | |
| Pest Control | |
| Yard Services | |
| Housekeeper | |
| Repair and maintenance | |
| Decorating and furnishings | |
| Consumable Household Items (Non-Groceries) | |
| Other ( ) | |
| FOOD | |
| Groceries (Food Only) | |
| Dining Out | |
| Work Related Lunch | |
| Snacks | |
| Beverages/Coffee | |
| Kid's School Lunches | |
| Other ( ) | |
| CLOTHING | |
| Adult's Clothes/Shoes | |
| Kid's Clothes/Shoes | |
| Dry Cleaning/Laundry/Alterations | |
| Other ( ) | |
| AUTO/TRANSPORTATION | |
| Fuel | |
| Repairs/maintenance | |
| Bus/Subway/Cab | |
| Tolls | |
| Lease Payments | |
| Other ( ) | |

| GIFTS & DONATIONS | $ |
|---|---|
| Tithes | $ - |
| Church Offerings and Contributions | |
| Charities & Charitable Donations | |
| Birthdays/Holidays | |
| Other ( ) | |
| LEISURE | |
| Music (CD's Computer Downloads, Satellite Radio etc.) | |
| Event Tickets (Movies/Plays/Concerts/Sporting Events) | |
| Computer games/video games/software | |
| Vacation/Travel | |
| Weekend/Day Trips | |
| Sports/Health Club (including equipment & apparel) | |
| Hobbies | |
| Socializing (Get-togethers, cookouts, dinner out, drinks) | |
| At-home leisure (books, subscriptions, movies, alcohol) | |
| Personal Enjoyment (Cigarettes, Beer, Wine, Liquor, Other) | |
| Other ( ) | |
| FAMILY/KIDS | |
| Child Support/Alimony | |
| Day Care/Camp | |
| Tuition | |
| Lessons | |
| Babysitters | |
| Sports | |
| Allowances | |
| Untrackable Cash for Kids | |
| Toys/Games/Gadgets | |
| Pet | |
| Other ( ) | |
| Other ( ) | |
| COMMUNICATIONS/COMPUTER | |
| Cell Phones | |
| Internet Access | |
| PDA services | |
| Other Internet Service Fees | |
| Computer expenses | |
| Other ( ) | |
| DEBT OBLIGATIONS | |
| Auto Loans | |
| $2^{nd}$ Mortgage/Home Equity | |
| Student Loans | |
| Secured/Unsecured Loans | |
| Credit Cards | |
| Other ( ) | |
| SAVINGS | |

500

FIG. 5A (PART 1)

| MEDICAL/DENTAL | |
| --- | --- |
| Doctors/Dentist | |
| Prescriptions | |
| Over the Counter Medicine/Vitamins | |
| Other ( ) | |
| INSURANCE | |
| Auto | |
| Life | |
| Health | |
| Home owners/Renters | |
| Disability | |
| Long-term care | |
| PERSONAL GROOMING/MAINTENANCE | |
| Hair | |
| Nails | |
| Spa Treatments/Pedicures/Massages | |
| Cosmetics | |
| Toiletries | |
| Other ( ) | |

| | |
| --- | --- |
| Emergency Fund | |
| 401(k), 403(b), 457 Plan Contribution | |
| IRA / Roth IRA Contributions | |
| Other Retirement | |
| Monthly Investment Deposits | |
| College Savings Deposits | |
| General Savings | |
| Short Term Financial Goals: ( ) | |
| Financial Goal ( ) | |
| Financial Goal ( ) | |
| Other ( ) | |
| OTHER (Don't leave anything out) | |
| | |
| | |
| | |
| | |
| Total expenditures | $ - |
| Total Monthly Provision | $ - |
| Less: Total Expenditures | $ - |

500

FIG. 5A (PART 2)

Weekly Expenditure Worksheet

| My Expenditures | Week 1 | Week 2 | Week 3 | Week 4 | Week 5 |
|---|---|---|---|---|---|
| HOUSING | | | | | |
| Mortgage/rent | $ | $ | $ | $ | $ |
| Home Owner Association/Condo Fees | | | | | |
| HOUSEHOLD MAINTENANCE | | | | | |
| Gas/Electric | | | | | |
| Electric | | | | | |
| Water/Sewer | | | | | |
| Trash Collection | | | | | |
| Phone | | | | | |
| Cable/satellite | | | | | |
| Security Monitoring | | | | | |
| Pest Control | | | | | |
| Yard Services | | | | | |
| Housekeeper | | | | | |
| Repair and maintenance | | | | | |
| Decorating and furnishings | | | | | |
| Consumable Household Items (Non-Groceries) | | | | | |
| Other (            ) | | | | | |
| FOOD | | | | | |
| Groceries (Food Only) | | | | | |
| Dining Out | | | | | |
| Work Related Lunch | | | | | |
| Snacks | | | | | |
| Beverages/Coffee | | | | | |
| Kid's School Lunches | | | | | |
| Other (            ) | | | | | |
| CLOTHING | | | | | |
| Adult's Clothes/Shoes | | | | | |
| Kid's Clothes/Shoes | | | | | |
| Dry Cleaning/Laundry/Alterations | | | | | |
| Other (            ) | | | | | |
| AUTO/TRANSPORTATION | | | | | |
| Fuel | | | | | |
| Repairs/maintenance | | | | | |
| Bus/Subway/Cab | | | | | |
| Tolls | | | | | |
| Lease Payments | | | | | |
| Other (            ) | | | | | |
| MEDICAL/DENTAL | | | | | |
| Doctors/Dentist | | | | | |
| Prescriptions | | | | | |
| Over the Counter Medicine/Vitamins | | | | | |
| Other (            ) | | | | | |
| INSURANCE | | | | | |
| Auto | | | | | |
| Life | | | | | |
| Health | | | | | |
| Home owners/Renters | | | | | |
| Disability | | | | | |
| Long-term care | | | | | |

510

FIG. 5B (PART 1)

| PERSONAL GROOMING/MAINTENANCE | | | | | |
|---|---|---|---|---|---|
| Hair | | | | | |
| Nails | | | | | |
| Spa Treatments/Pedicures/Massages | | | | | |
| Cosmetics | | | | | |
| Toiletries | | | | | |
| Other ( ) | | | | | |
| GIFTS & DONATIONS | | | | | |
| Tithes | | | | | |
| Church Offerings and Contributions | | | | | |
| Charities & Charitable Donations | | | | | |
| Birthdays/Holidays | | | | | |
| Other ( ) | | | | | |

Chap 2          Weekly Expenditure Worksheet

510

FIG. 5B (PART 2)

| LEISURE | | | | | |
|---|---|---|---|---|---|
| Music (CD's Computer Downloads, Satellite Radio etc.) | | | | | |
| Event Tickets (Movies/Plays/Concerts/Sporting Events) | | | | | |
| Computer games/video games/software | | | | | |
| Vacation/Travel | | | | | |
| Weekend/Day Trips | | | | | |
| Sports/Health Club (including equipment & apparel) | | | | | |
| Hobbies | | | | | |
| Socializing (Get-togethers, cookouts, dinner out, drinks) | | | | | |
| At-home leisure (books, subscriptions, movies, alcohol) | | | | | |
| Personal Enjoyment (Cigarettes, Beer, Wine, Liquor, Other) | | | | | |
| Other ( ) | | | | | |
| FAMILY/KIDS | | | | | |
| Child Support/Alimony | | | | | |
| Day Care/Camp | | | | | |
| Tuition | | | | | |
| Lessons | | | | | |
| Babysitters | | | | | |
| Sports | | | | | |
| Allowances | | | | | |
| Untrackable Cash for Kids | | | | | |
| Toys/Games/Gadgets | | | | | |
| Pet | | | | | |
| Other ( ) | | | | | |
| Other ( ) | | | | | |
| COMMUNICATIONS/COMPUTER | | | | | |
| Cell Phones | | | | | |
| Internet Access | | | | | |
| PDA services | | | | | |
| Other Internet Service Fees | | | | | |
| Computer expenses | | | | | |
| Other ( ) | | | | | |
| DEBT OBLIGATIONS | | | | | |
| Auto Loans | | | | | |
| 2$^{nd}$ Mortgage/Home Equity | | | | | |
| Student Loans | | | | | |
| Secured/Unsecured Loans | | | | | |
| Credit Cards | | | | | |
| Other ( ) | | | | | |
| SAVINGS | | | | | |
| Emergency Fund | | | | | |
| 401(k), 403(b), 457 Plan Contribution | | | | | |
| IRA / Roth IRA Contributions | | | | | |
| Other Retirement | | | | | |
| Monthly Investment Deposits | | | | | |
| College Savings Deposits | | | | | |
| General Savings | | | | | |
| Short Term Financial Goals: ( ) | | | | | |
| Financial Goal ( ) | | | | | |
| Financial Goal ( ) | | | | | |
| Other ( ) | | | | | |
| OTHER (Don't leave anything out) | | | | | |
| Total Expenditures | $ - | $ - | $ - | $ - | $ - |

Chap 2                          Weekly Expenditure Worksheet

A Visual Aid towards Recognizing God's Created Design

The following questions may aid you in Developing Vision toward God's Purposed Plans. *Ephesians 1:11* indicates that you were predestined according to God's plans and his will. You were created with characteristics and attributes which predispose you towards plans that fit who you are and what you have been equipped to accomplish.

Consider the following as you begin to recognize those deposits that have uniquely shaped your personality, passion, perspective and purpose.

1) What are my core values?

2) What are the principles that I base my life on? What is my moral constitution?

3) What should I be doing? What areas of achievement should I be striving towards? What seeds should I be sowing or what contributions should I be making?

4) What am I passionate about or what do I treasure?

5) What kind of person is it important for me to be? (my character)

6) Who's lives should I be influencing?

600
FIG. 6

Personal Vision Statement

Who are you? How do you see yourself? Envision the person who you're striving to be or who you know you should be working toward becoming? To help you develop the image in your mind, you may want to jot down some answers to the questions on the accompanying page.

_____        _____
_____        _____
_____        _____
_____        _____
_____        _____

*Then the Lord answered me and said: "Write the vision and make it plain on tablets, That he may run who reads it".*
*Habakkuk 2:2*

Now create a Statement that incorporates elements from your list. Your written statement should allow you to see what is important and what matters most to you, who you really are and what you really want.

Debt Ledger

Creditors Owed as of _____

| Creditor | APR | Current Balance | Minimum Payment | Due Date | Notes |
|---|---|---|---|---|---|
| | % | $ - | $ - | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| TOTAL | | $ - | $ - | | |

Loan Transaction Ledger

Month _____ Date: _____

| | Creditor _____ | | | Creditor _____ | | | Creditor _____ | |
|---|---|---|---|---|---|---|---|---|
| Beginning Balance | Payments Toward Principle | Ending Balance | Beginning Balance | Payments Toward Principle | Ending Balance | Beginning Balance | Payments Toward Principle | Ending Balance |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| TOTALS | $ | - | | $ | - | | $ | - |

1000
FIG. 10

| BALANCED GOALS WORKSHEET | | | | |
|---|---|---|---|---|
| GOAL | SPIRITUAL | HOME ENVIRONMENT | WORK/CAREER | RELATIONSHIPS |
| 0-1 Year<br>SHORT TERM | | | | |
| 1-5 Years<br>MID TERM | | | | |
| > 5 years<br>LONG TERM | | | | |

1100
FIG. 11A

GOAL ASSESSMENT CONT'D

| GOAL | FINANCE | PERSONAL DEVELOPMENT | HEALTH | FUN, RECREATION & LEISURE |
|---|---|---|---|---|
| 0-1 Year<br>SHORT TERM | | | | |
| 1-5 Years<br>MID TERM | | | | |
| > 5 years<br>LONG TERM | | | | |

1100
FIG. 11B

BALANCED PRIORITIES WORKSHEET

| SPIRITUAL | HOME ENVIRONMENT | WORK/CAREER | RELATIONSHIPS |
|---|---|---|---|
|  |  |  |  |

| FINANCE | PERSONAL DEVELOPMENT | HEALTH | FUN, RECREATION & LEISURE |
|---|---|---|---|
|  |  |  |  |

1200
FIG. 12

Financial Planning Personal Goals and Priorities Worksheet

Financial Life Personal Priorities:
List and rank your five most important financial priorities goals:

*These are areas of spending, saving or giving where you are strongly committed to allocating your finances because of personal values and priorities. (You may or may not currently be allocating your finances in these areas but have a committed intent.)*

1.) _____
2.) _____
3.) _____
4.) _____
5.) _____

Financial Life Personal Goals:
List and rank your five most important financial goals:

*These are those things that you must set aside or accumulate financial resources to either acquire, accomplish or achieve. (Some may be the same as your financial priorities.)*

Short-term (Less than 1 year)

1.) _____
2.) _____
3.) _____
4.) _____
5.) _____

Intermediate- and Long-term (1-3 years)

6.) _____
7.) _____
8.) _____
9.) _____
10.) _____

Long-term (3 years or more)

Statement of Financial Position

From: January 1, 20____ through _____ ___, 20___

ASSETS

Cash/Cash Equivalents

| | |
|---|---|
| Checking Account | $ - |
| Savings Account | |
| Money Market | |
| Life Insurance Cash Value | |
| CD's | |

| | |
|---|---|
| Total Liquid Assets | $ - |

Invested Assets

| | |
|---|---|
| Stock Portfolio | $ - |
| Mutual Funds | |
| 401(k)'s | |
| Traditional IRA's | |
| Roth IRA's | |
| Annuities | |
| Bonds | |
| CD's | |
| Real Estate Investments | |
| Vested portion of pension plans | |
| Other | |
| Other | |

| | |
|---|---|
| Total Cash/Cash Equivalents | $ - |

Use Assets

| | |
|---|---|
| Residence | $ - |
| Automobiles | |
| Other Vehicles | |
| Personal Property | |

| | |
|---|---|
| Total Use Assets | $ - |
| TOTAL ASSETS | $ - |

LIABILITIES AND NET WORTH

Liabilities

| | |
|---|---|
| Credit card balance | $ - |
| Auto loans | |
| Personal Loans | |
| Mortgage balance | |
| Unpaid Bills | |
| Income Tax Owed | |
| Other Debt (Student Loan) | |
| Business Loan | |
| Investment Loan | |
| 401K Loan | |
| Life Insurance Loan | |
| Other Investment Loans | |

| | |
|---|---|
| Total Liabilities | $ - |

| | |
|---|---|
| Net Worth | $ - |
| (assets minus liabilities) | |

| | |
|---|---|
| TOTAL LIABILITIES AND NET WORTH | $ - |

Annual Cash Flow Statement (TOTAL INFLOW MUST EQUAL TOTAL OUTFLOWS)

From: January 1, 20___ through _____ ___, 20___

INFLOWS

| | |
|---|---|
| Gross Salary | $ _____ - ___ |
| Part-Time Work | _____ |
| Self-Employment | _____ |
| Bonus/Overtime/Tips | _____ |
| Child Support | _____ |
| Pension | _____ |
| Social Security | _____ |
| Interest/Dividends | _____ |
| Other ( ) | _____ |
| Tax Refunds | _____ |
| Savings Withdrawls[1] | _____ |
| Investment Redemptions[2] | _____ - ___ |

$ _____ - _____
*Must = gross annul income*

CASH OUTFLOWS

SAVINGS AND INVESTMENTS

Savings
- Emergency Fund — $ _____ - ___
- Savings (General) — _____ - ___
- Trip & Vacation Fund — _____ - ___
- Short Term Goals: ( ) — _____ - ___
- Long Term Goals: ( ) — _____ - ___
- College Saving's Plan — _____

Investment
- Retirement — _____
- Other Investment — _____

Total Savings and Investments $ _____ - _____

FIXED OUTFLOWS

Debt Obligations
- Mortgage[3] — _____ - ___
- 2nd Mortgage/Home Equity — _____ - ___
- Auto loans — _____ - ___
- Student loans — _____ - ___
- Secured/Unsecured Loans — _____ - ___

Insurance Premiums
- Auto — $ _____ - ___
- Life — _____
- Health — _____
- Home owners/Renters — _____
- Disability — _____

Family and Education
    Child Support/Alimony
    Alimony
    Day Care/Camp
    School Tuition
    Lessons
    Sports
    Other (        )

Housing and Utilities
    Rent
    HOA Fees (includes trash collection)
    House Security System
    Cable/satellite
    Internet
    Trash Collection/Pest Control
    House cleaning
    Other (        )
    Other (        )

Contributions
    Tithes and Offerings

Miscellaneous
    Other (        )
    Other (        )
    Other (        )
    Other (        )
    Other (        )
    Other (        )
    Other (        )

Total Fixed Outflows    $ -

VARIABLE OUTFLOWS

Taxes
    Federal Withholding
    State Withholding
    Real Estate (if paid separate from mortgage)
    Property – Other

Housing and Utilities
    Gas
    Electric
    Water/sewer
    Phone (includes internet)
    Internet
    Home repairs/maint.

Transportation
    Gasoline
    Parking
    License tags
    Repairs/maint.
    Bus/Subway/Cab
    Tolls/Carpool

Food
    Groceries
    Lunches/Snacks/Sodas
    School lunches
    Dining Out

Clothing
    Parents
    Children
    Dry Cleaning/Laundry
Leisure and Recreation
    Videos/Compact Discs
    Movies/Plays/Concerts/Sporting Events
    Vacation Trips
    Sport/Hobby/Health Club
    Newspaper/Books/Magazines
    Other Entertainment
Contributions and Gifts
    Religious Contributions
    Charities
    Birthdays/Holidays
    Other: (          )
Medical/Dental
    Doctors/Dentist
    Prescriptions
    Vitamins
Allowances
    Parents
    Children
Personal
    Hair/Nails
    Toiletries
    Tobacco/Alcohol
DEBT OBLIGATIONS
    Credit Card 1 (          )
    Credit Card 2 (          )
    Credit Card 3 (          )
    Credit Card 4 (          )
OTHER (Don't leave anything out)
    Other (          )
    Other (          )
    Other (          )
    Other (          )
    Other (          )
    Other (          )
    Other (          )
    Other (          )
    Other (          )

Total Variable Outflows      $     -

Total Outflows      $     -

*Must = total inflows*

[1] Withdrawals from Savings
[2] Withdrawals and Redemptions from Retirement Accts, Mutual Funds, Stocks, Bonds & CD's
[3] Includes principal, interest, and property taxes

1500
FIG. 15C

Budget Ratio Analysis

| Category | Amount | % of Income | Spending Guidelines |
|---|---|---|---|
| Total Net Income | $ 2,000 | | |
| Charitable Giving / Tithes | $ - | 0% | 10% |
| Housing | $ - | 0% | 32-35% |
| Transportation | $ - | 0% | 9-20% |
| Food | $ - | 0% | 8-15% |
| Family Care | $ - | 0% | 8-19% |
| Total Living Expense | $ - | 0% | 27-35% |
| Debt Obligations | $ - | 0% | 18-28 |
| Leisure | $ - | 0% | 4-6% |
| Savings | $ - | 0% | 2-10% |
| Clothing | $ - | 0% | 6-8% |
| Health Care | $ - | 0% | 4-6% |
| Insurance | $ - | 0% | 7-9% |
| Debt to Income Ratio | | 0% | ≤36% |

Summary of Financial Findings

Based on the information presented in each lesson and your analytical review of the forms and reports completed in lessons 1-7, provide a summary of your initial impressions about what you've come to recognize or what has been confirm about your finances and/or financial life.

Finance and Financial Values Evaluation Questionnaire
(Abbreviated Sample)

I     Evaluating our Earthly Economics

A.     Savings
1. Does saving for retirement have a lower priority than other savings goals.
2. Do you know the maximum amount of discretionary income that you can splurge with each month and stay within you allotted limit?
3. Do you have at least three to six months of living expenses put away in savings in for unforeseen events and emergencies.
4. Do you contribute a set percentage of your income going regularly into a long-term retirement account each pay period?
5.

B.     Debt
1. Is more than 15 percent of your income going to pay debts?
2. Are you unable to save because any income left after bills are paid must go toward debt repayments
3. Do you check your credit report at least annually and know that there are no discrepancies or issues that need to be addressed or corrected?
4.

C.     Wants vs. Needs

If your income was reduced by 10% are there things that you consider as needs that could be adjusted in your spending and you would still be content?

II     Reflecting our True Values and Priorities

A.     Uncovering Your True Values

1. Does your areas of spending or spending patterns contradict the areas of focus that reflect what you described in your Vision Statement?
2. Are there areas requiring your money that that you believe strongly that God desires you to focus on but because of your hobbies and discretionary spending you lack the funds to move forward on?

B.     Committing to Priorities
1. Do you often shop on impulse using money that was intended for something else?
2. In looking at your Statement of Cash Flow and Statement of Financial Position, does the allocation of your money reflect what you listed as priorities and your desired goals?
3. Does your areas of spending or spending patterns contradict the areas of focus that reflect what you described in your Vision Statement?

C. Focusing on Goals

1. Have you set defined target for things that you desire to accomplish and achieve in your life?
2. For goals that you must accumulate funds for, have you calculated exactly how much and when you should have so that the funds are fully available to secure your goal?
3. Do you have the potential to increase your income to get some of your most pressing financial issues but are unwilling to make the extra or sacrifice your free time?

D. Obedience to Faith Principles

1. Based on Scriptural teachings related to areas that comprise your financial life rate yourself on how well you are stewarding your finances in following areas?

| | | | | | |
|---|---|---|---|---|---|
| • Spending | 1 | 2 | 3 | 4 | 5 |
| • Saving | 1 | 2 | 3 | 4 | 5 |
| • Giving | 1 | 2 | 3 | 4 | 5 |
| • Tithing | 1 | 2 | 3 | 4 | 5 |
| • Borrowing | 1 | 2 | 3 | 4 | 5 |
| • Lending | 1 | 2 | 3 | 4 | 5 |
| • Debt | 1 | 2 | 3 | 4 | 5 |
| • Work | 1 | 2 | 3 | 4 | 5 |
| • Family Responsibility | 1 | 2 | 3 | 4 | 5 |
| • Wealth | 1 | 2 | 3 | 4 | 5 |
| • Investing | 1 | 2 | 3 | 4 | 5 |
| • Counsel | 1 | 2 | 3 | 4 | 5 |

III Disciplining our Habits and Tendencies

A. Resisting Temptation

1. Are there areas that you continue to splurge more than $50 a week while being frustrated about not having enough money for important things in your life?

2. Do you have a hard time going to the store and refraining from making unplanned purchase?
3. Do you often make choices that are financially motivated that oppose your values?

B. Lack of Discipline and Developing Discipline

1. Do you know that if you kept better records of your spending you would manage your finances better?
2. Do you on a regular basis, set goals so that you are not bouncing around form one thing to another?
3. Are you often distracted from activities and often don't complete what you set out to do?
4. Do you make sufficient income to meet your needs but often have bounced checks?
5. Does using a charge card cause you to incur more expenses than if you were using cash, checks or a debit card?

IV Examination of your attitudes and motives
    A. Wrong Motives as an Obstacle to God's Blessings
        1. Do you often give expensive gifts that are more than you can afford to impress others?
        2. Do you give out of expecting something back?
        3. Do you tithe because you are looking for God to reward you with something?

B. Impatience and Developing Patience
        1. When you want something, instead of saving for it, do you go out and get it on credit?
        2. If you see something you want, do you first consult your budget and to determine whether it is affordable at the present time?
        3. When you enter a long-term financial commitment do you rush into them without understanding all the terms?
        4. When you make big-ticket purchases, such as a car, do you consider the long-term cost commitments and the associated costs, or just get what you want because you can afford to pay the monthly note?

C. Greed and Combating Greed
        1. Do you always have to have the best of everything?
        2. Do you often spend money so that you can keep up with the Joneses
        3. Do spend a lot of money replacing things because you want the newest and updated versions while never having money to achieve more purposeful goals?
        4. Do you tend to only make "investment" in what looks like a get-rich-quick endeavors but fail to take the required steps to develop a long-term financial plans?

Scriptural Database Content
(Abbreviated Sample)

I    Evaluating our Earthly Economics

A.    Savings

*Ants are creatures of little strength, yet they store up their food in the summer;*
Proverbs 30:25

*[6] Go to the ant, you sluggard; consider its ways and be wise! [7] It has no commander, no overseer or ruler, [8] yet it stores its provisions in summer and gathers its food at harvest.*    Proverb 6:6-9 NIV

*A good man leaveth an inheritance of his children's children: and the wealth of the sinner is laid up for the just.*    Proverbs 13:22

B.    Debt

*The wicked borrows and does not pay back, but the righteous is gracious and gives.*    Psalm 37:21

*The rich ruleth over the poor, and the borrower is servant to the lender.*
Proverbs 22:7 NIV

*[27] Withhold not good from them to whom it is due, when it is in the power of thine hand to do it. [28] Say not unto they neighbour, Go, and come again, and tomorrow I will give; when thou hast it by thee.*    Proverbs 22:7 NIV

C.    Spending – Wants vs. Needs

*There is treasure to be desired and oil in the dwelling of the wise, but a foolish man spendeth it up.*    Proverbs 21:20

*He that loveth pleasure shall be a poor man he that loveth wine and oil shall not be rich.*    Proverbs 21:17

II    Reflecting our True Values and Priorities

A.    Uncovering Your True Values

*[19] As a face is reflected in water, so the heart reflects the real person.*
Proverbs 27:19-20 (NLT)

B.    Committing to Priorities

*Therefore, since we are surrounded by such a great cloud of witnesses, let us throw off everything that hinders and the sin that so easily entangles, and let us run with perseverance the race marked out for us.*    Hebrews 12:1-3

*Turn my eyes away from worthless things; preserve my life according to your word.*
Psalm 119:37 NIV

C. Focusing on Goals

*²⁴Do you not know that in a race all the runners run, but only one gets the prize? Run in such a way as to get the prize. ²⁵Everyone who competes in the games goes into strict training. They do it to get a crown that will last; but we do it to get a crown that will last forever. ²⁶Therefore I do not run like a man running aimlessly; I do not fight like a man beating the air.*  1 Corinthians 9:24-27 (NIV)

D. Obedience to Faith Principles

*But the one who hears my words and does not put them into practice is like a man who built a house on the ground without a foundation. The moment the torrent struck that house, it collapsed and its destruction was complete."*  Luke 6:49 NIV

*Whatever you have learned or received or heard from me, or seen in me-put it into practice. An the God of peace will be with you.*  Philippians 4:9 (NIV)

*"And a servant who knows what the master wants, but isn't prepared and doesn't carry out those instructions, will be severely punished.*  Matthew 12:47 (NLT)

III Disciplining our Habits and Tendencies

A. Resisting Temptation

*¹³And remember, when you are being tempted, do not say, "God is tempting me." God is never tempted to do wrong, [a] and he never tempts anyone else. ¹⁴Temptation comes from our own desires, which entice us and drag us away. 15 These desires give birth so sinful actions. And when sin is allowed to grow, it gives birth to death.*
James 1:13-15 (NLT)

B. Lack of Discipline and Developing Discipline

*Poverty and shame will come to him who neglects discipline, but he who regards reproof will be honored.*  Proverbs 13:18

*The plans of diligent lead surely advantage, but every one who is hasty comes surely to poverty.*  Proverbs 21:5

*He becometh poor that dealeth with a slack hand: but the hand of the diligent maketh rich.*
Proverbs 10:3

*²Grace and peace be multiplied unto you through the knowledge of God, and of Jesus our Lord. ³According as his divine power hath given unto us all things that pertain unto life and godliness, through the knowledge of him that hath called us to glory and virtue: ⁴Whereby are given unto us exceeding great and precious promises: that by these ye might be partakers of the divine nature, having escaped the corruption that is in the world through lust. ⁵And beside this, giving all diligence, add to your faith virtue; and to virtue knowledge; ⁶And to knowledge temperance; and to temperance patience; and to patience godliness; ⁷And to godliness brotherly kindness; and to brotherly kindness charity. ⁸For if these things be in you, and abound, they make you that ye shall neither be barren nor unfruitful in the knowledge of our Lord Jesus Christ. ⁹But he that lacketh these things is blind, and cannot see afar off, and hath forgotten that he was purged from his old sins. ¹⁰Wherefore the rather, brethren, give diligence to make your calling and*

1900
FIG. 19B

|     |     | election sure: for if ye do these things, ye shall never fall: |
| --- | --- | --- |
|     |     | 2 Peter 1:2-10 |
| IV  | Confronting our Attitudes and Motives | |
|     | A.  | Wrong Motives as an Obstacle to God's Blessings |

*All a man's ways seem innocent to him, but motives are weighed by the LORD*
Proverbs 16:3 NIV

*The LORD's light penetrates the human spirit, exposing every hidden motive.*
Proverbs 20:27 NLT

*When you ask, you do not receive, because you ask with wrong motives, that you may spend what you get on your pleasures.*  James 4:3

B.    Impatience and Developing Patience

*$^{35}$Cast not away therefore your confidence, which hath great recompence of reward. $^{36}$For ye have need of patience, that, after ye have done the will of God, ye might receive the promise.*  Hebrews 10:35-36

*And let us not be weary in well doing: for in due season we shall reap, if we faint not.*
Galatians 6:9

*Wait on the LORD: be of good courage, and he shall strengthen thine heart: wait, I say, on the LORD.*  Psalm 27:14

*$^{2}$Grace and peace be multiplied unto you through the knowledge of God, and of Jesus our Lord. $^{3}$According as his divine power hath given unto us all things that pertain unto life and godliness, through the knowledge of him that hath called us to glory and virtue: $^{4}$Whereby are given unto us exceeding great and precious promises: that by these ye might be partakers of the divine nature, having escaped the corruption that is in the world through lust. $^{5}$And beside this, giving all diligence, add to your faith virtue; and to virtue knowledge; $^{6}$And to knowledge temperance;* <u>*and to temperance patience;*</u> *and to patience godliness; $^{7}$And to godliness brotherly kindness; and to brotherly kindness charity. $^{8}$For if these things be in you, and abound, they make you that ye shall neither be barren nor unfruitful in the knowledge of our Lord Jesus Christ. $^{9}$But he that lacketh these things is blind, and cannot see afar off, and hath forgotten that he was purged from his old sins. $^{10}$Wherefore the rather, brethren, give diligence to make your calling and election sure: for if ye do these things, ye shall never fall:*
2 Peter 1:2-10

C.    Greed and Combating Greed

*$^{10}$Those who love money will never have enough. How absurd to think that wealth brings true happiness! $^{11}$The more you have, the more people come to help you spend it. So what is the advantage of wealth – except perhaps to watch it and run through your fingers!*
Ecclesiastes 5:10-11 NLT

*For the love of money is a root of all kinds of evil, for which some have strayed from the faith in their greediness, and pierced themselves through, with many sorrows.*
1 Timothy 6:10

*Have you found honey? Eat only what you need, lest you have it in excess and vomit it.*
Proverbs 25:16

*A faithful man shall abound with blessings: but he that maketh haste to be rich shall not be innocent.*
Proverbs 28:20

*[12] I know how to get along with humble means, and I also know how to live in prosperity; in any and every circumstance I have <u>learned</u> the secret of being filled and going hungry, both of having abundance and suffering need. [13] can do all things through Him who strengthens me.*
Philippians 4:12-13

*[6] But godliness with contentment is great gain. [7] For we brought nothing into this world, and it is certain we can carry nothing out. [8] And having food and raiment let us be therewith content.*
1 Timothy 6:6-8

D.  Developing Godly Motives

*[18] But when you are directed by the Holy Spirit, you are no longer subject to the law. [19] When you follow the desires of your sinful nature, your lives will produce these evil results: sexual immorality, impure thoughts, eagerness for lustful pleasure, [20] idolotry, participation in demonic activities, hostility, quarreling, jealousy, outbursts of anger, selfish ambition, divisions, the feeling that everyone is wrong except those in your own little group, [21] envy, drunkenness, wild parties, and other kind of sin. Let me tell you again, as I have before, that anyone living that sort of life will not inherit the Kingdom of God. [22] But when the Holy Spirit controls our lives, he will produce this kind of fruit in us: love, joy, peace, patience, kindness, goodness, faithfulness, [23] gentleness, and self-control..........*
Galatians 5:18-22

Commitment Strategy Worksheet

| Actions and Attitudes I want to Change | Replace it with What? | What is Required to make this change happen? | Relevant Scriptures that will help my stewardship in this area. |
|---|---|---|---|
| | | | |
| | | | |
| | | | |
| | | | |
| | | | |
| | | | |
| | | | |
| | | | |
| | | | |
| | | | |
| | | | |
| | | | |
| | | | |

2000
FIG. 20

Income Allocation Adjustment Worksheet

| MONTHLY NET INCOME: | Current Income | Necessary Changes | Preliminary Planned Income |
|---|---|---|---|
| | $ 3,000 | $ 400 | $ 2,600 |

| MONTHLY EXPENDITURES | Current Allocation $ | Necessary Changes + or ( - ) | Preliminary Planned Spending $ | Priority Level (Check one) | |
|---|---|---|---|---|---|
| | | | | Necessity | Nicety |
| HOUSING | | | | | |
| Mortgage/rent | $ - | | $ - | | |
| Home Owner Association/ Condo Fees | | | - | | |
| HOUSEHOLD MAINTENANCE | | | | | |
| Gas /Electric | | | - | | |
| Electric | | | - | | |
| Water/sewer | | | - | | |
| Trash Collection | | | - | | |
| Phone | | | - | | |
| Cable/satellite | | | - | | |
| Security Monitoring | | | - | | |
| Pest Control | | | - | | |
| Yard Services | | | - | | |
| Housekeeper | | | - | | |
| Repair and maintenance | | | - | | |
| Decorating and furnishings | | | - | | |
| Consumable Household Items (Non-Groceries) | | | - | | |
| Other ( ) | | | - | | |
| FOOD | | | | | |
| Groceries (Food Only) | | | - | | |
| Dining Out | | | - | | |
| Work Related Lunch | | | - | | |
| Snacks | | | - | | |
| Beverages/Coffee | | | - | | |
| Kid's School Lunches | | | - | | |
| Other ( ) | | | - | | |
| CLOTHING | | | | | |
| Adult's Clothes/Shoes | | | - | | |
| Kid's Clothes/Shoes | | | - | | |
| Dry Cleaning/Laundry/Alterations | | | - | | |
| Other ( ) | | | - | | |
| AUTO/TRANSPORTATION | | | | | |
| Fuel | | | - | | |
| Repairs/maintenance | | | - | | |
| Bus/Subway/Cab | | | - | | |
| Tolls | | | - | | |
| Lease Payments | | | - | | |
| Other ( ) | | | - | | |
| MEDICAL/DENTAL | | | | | |
| Doctors/Dentist | | | - | | |
| Prescriptions | | | - | | |
| Over the Counter Medicine/Vitamins | | | - | | |

Financial Priorites and Goal Setting Planner

Financial Life Personal Priorities:

1.) _____
2.) _____
3.) _____
4.) _____
5.) _____

Financial Life Personal Goals:

| | Priority Rank | Estimated Cost | Amount Already accumulated or available | Full funding target date | Target start date | Amount to save per monthh |
|---|---|---|---|---|---|---|

Short-term (Less than 1 year)

| | | | | | | |
|---|---|---|---|---|---|---|
| 1.) | | | | | | |
| 2.) | | | | | | |
| 3.) | | | | | | |
| 4.) | | | | | | |
| 5.) | | | | | | |

Intermediate-term (1 - 5 years)

| | | | | | | |
|---|---|---|---|---|---|---|
| 6.) | | | | | | |
| 7.) | | | | | | |
| 8.) | | | | | | |
| 9.) | | | | | | |
| 10.) | | | | | | |

Long-term (5 years or more)

| | | | | | | |
|---|---|---|---|---|---|---|
| 11.) | | | | | | |
| 12.) | | | | | | |
| 13.) | | | | | | |
| 14.) | | | | | | |
| 15.) | | | | | | |

Monthly Cost of Making Your Goals a Reality

GOAL #1

INPUT
Goal Amount: $ 12,000
APR Rate: 4.00% Annually
Number of Years: 7.00 Years Monthly Savings to Reach your Goal: $ 123.61

Goal: _____

GOAL #2

INPUT
Goal Amount: $ 13,000
APR Rate: 8.00% Annually
Number of Years: 5.00 Years Monthly Savings to Reach your Goal: $ 175.75

Goal: _____

GOAL #3

INPUT
Goal Amount: $ 45,000
APR Rate: 5.25% Annually
Number of Years: 20.00 Years Monthly Savings to Reach your Goal: $ 105.89

Goal: _____

2300
FIG. 23

Monthly Cost of Reaching Your Accumulation Goal

INPUT
Number of Years to Reach Goal: 7.00 Years

| Accumulation Goal | Average Annual Return | | | | | | | | | | | |
|---|---|---|---|---|---|---|---|---|---|---|---|---|
| | 1% | 2% | 3% | 4% | 5% | 6% | 7% | 8% | 9% | 10% | 11% | 12% |
| $ 500 | 6 | 6 | 5 | 5 | 5 | 5 | 5 | 4 | 4 | 4 | 4 | 4 |
| $ 1,000 | 11 | 11 | 11 | 10 | 10 | 10 | 9 | 9 | 9 | 8 | 8 | 8 |
| $ 1,500 | 17 | 17 | 16 | 15 | 15 | 14 | 14 | 13 | 13 | 12 | 12 | 11 |
| $ 2,000 | 23 | 22 | 21 | 21 | 20 | 19 | 18 | 18 | 17 | 16 | 16 | 15 |
| $ 2,500 | 29 | 28 | 27 | 26 | 25 | 24 | 23 | 22 | 21 | 20 | 20 | 19 |
| $ 3,000 | 34 | 33 | 32 | 31 | 30 | 29 | 28 | 27 | 26 | 25 | 24 | 23 |
| $ 3,500 | 40 | 39 | 37 | 36 | 35 | 33 | 32 | 31 | 30 | 29 | 28 | 27 |
| $ 4,000 | 46 | 44 | 43 | 41 | 40 | 38 | 37 | 35 | 34 | 33 | 32 | 30 |
| $ 4,500 | 52 | 50 | 48 | 46 | 45 | 43 | 41 | 40 | 38 | 37 | 35 | 34 |
| $ 5,000 | 57 | 55 | 53 | 52 | 50 | 48 | 46 | 44 | 43 | 41 | 39 | 38 |
| $ 5,500 | 63 | 61 | 59 | 57 | 55 | 53 | 51 | 49 | 47 | 45 | 43 | 42 |
| $ 6,000 | 69 | 66 | 64 | 62 | 60 | 57 | 55 | 53 | 51 | 49 | 47 | 45 |
| $ 6,500 | 75 | 72 | 69 | 67 | 65 | 62 | 60 | 58 | 55 | 53 | 51 | 49 |
| $ 7,000 | 80 | 78 | 75 | 72 | 69 | 67 | 64 | 62 | 60 | 57 | 55 | 53 |
| $ 7,500 | 86 | 83 | 80 | 77 | 74 | 72 | 69 | 66 | 64 | 61 | 59 | 57 |
| $ 8,000 | 92 | 89 | 85 | 82 | 79 | 76 | 74 | 71 | 68 | 66 | 63 | 61 |
| $ 8,500 | 98 | 94 | 91 | 88 | 84 | 81 | 78 | 75 | 72 | 70 | 67 | 64 |
| $ 9,000 | 103 | 100 | 96 | 93 | 89 | 86 | 83 | 80 | 77 | 74 | 71 | 68 |
| $ 9,500 | 109 | 105 | 102 | 98 | 94 | 91 | 87 | 84 | 81 | 78 | 75 | 72 |
| $ 10,000 | 115 | 111 | 107 | 103 | 99 | 96 | 92 | 89 | 85 | 82 | 79 | 76 |
| $ 10,500 | 121 | 116 | 112 | 108 | 104 | 100 | 97 | 93 | 90 | 86 | 83 | 80 |
| $ 11,000 | 126 | 122 | 118 | 113 | 109 | 105 | 101 | 97 | 94 | 90 | 87 | 83 |
| $ 11,500 | 132 | 127 | 123 | 118 | 114 | 110 | 106 | 102 | 98 | 94 | 91 | 87 |
| $ 12,000 | 138 | 133 | 128 | 124 | 119 | 115 | 110 | 106 | 102 | 98 | 95 | 91 |
| $ 12,500 | 144 | 139 | 134 | 129 | 124 | 120 | 115 | 111 | 107 | 102 | 99 | 95 |
| $ 13,000 | 149 | 144 | 139 | 134 | 129 | 124 | 120 | 115 | 111 | 107 | 102 | 99 |
| $ 13,500 | 155 | 150 | 144 | 139 | 134 | 129 | 124 | 120 | 115 | 111 | 106 | 102 |

2400
FIG. 24A

Number of Years to Reach Goal: 7.00 Years

Avergage Annual Return

| Accumulation Goal | 1% | 2% | 3% | 4% | 5% | 6% | 7% | 8% | 9% | 10% | 11% | 12% |
|---|---|---|---|---|---|---|---|---|---|---|---|---|
| $ 14,000 | 161 | 155 | 150 | 144 | 139 | 134 | 129 | 124 | 119 | 115 | 110 | 106 |
| $ 14,500 | 167 | 161 | 155 | 149 | 144 | 139 | 133 | 128 | 124 | 119 | 114 | 110 |
| $ 15,000 | 172 | 166 | 160 | 155 | 149 | 143 | 138 | 133 | 128 | 123 | 118 | 114 |
| $ 15,500 | 178 | 172 | 166 | 160 | 154 | 148 | 143 | 137 | 132 | 127 | 122 | 117 |
| $ 16,000 | 184 | 177 | 171 | 165 | 159 | 153 | 147 | 142 | 136 | 131 | 126 | 121 |
| $ 16,500 | 190 | 183 | 176 | 170 | 164 | 158 | 152 | 146 | 141 | 135 | 130 | 125 |
| $ 17,000 | 195 | 188 | 182 | 175 | 169 | 163 | 156 | 151 | 145 | 139 | 134 | 129 |
| $ 17,500 | 201 | 194 | 187 | 180 | 174 | 167 | 161 | 155 | 149 | 143 | 138 | 133 |
| $ 18,000 | 207 | 199 | 192 | 185 | 179 | 172 | 166 | 159 | 153 | 148 | 142 | 136 |
| $ 18,500 | 213 | 205 | 198 | 191 | 184 | 177 | 170 | 164 | 158 | 152 | 146 | 140 |
| $ 19,000 | 218 | 211 | 203 | 196 | 189 | 182 | 175 | 168 | 162 | 156 | 150 | 144 |
| $ 19,500 | 224 | 216 | 208 | 201 | 194 | 186 | 180 | 173 | 166 | 160 | 154 | 148 |
| $ 20,000 | 230 | 222 | 214 | 206 | 199 | 191 | 184 | 177 | 171 | 164 | 158 | 152 |
| $ 20,500 | 236 | 227 | 219 | 211 | 203 | 196 | 189 | 182 | 175 | 168 | 162 | 155 |
| $ 21,000 | 241 | 233 | 224 | 216 | 208 | 201 | 193 | 186 | 179 | 172 | 166 | 159 |
| $ 21,500 | 247 | 238 | 230 | 221 | 213 | 206 | 198 | 191 | 183 | 176 | 169 | 163 |
| $ 22,000 | 253 | 244 | 235 | 227 | 218 | 210 | 203 | 195 | 188 | 180 | 173 | 167 |
| $ 22,500 | 258 | 249 | 240 | 232 | 223 | 215 | 207 | 199 | 192 | 184 | 177 | 170 |
| $ 23,000 | 264 | 255 | 246 | 237 | 228 | 220 | 212 | 204 | 196 | 189 | 181 | 174 |
| $ 23,500 | 270 | 260 | 251 | 242 | 233 | 225 | 216 | 208 | 200 | 193 | 185 | 178 |
| $ 24,000 | 276 | 266 | 256 | 247 | 238 | 229 | 221 | 213 | 205 | 197 | 189 | 182 |
| $ 24,500 | 281 | 272 | 262 | 252 | 243 | 234 | 226 | 217 | 209 | 201 | 193 | 186 |
| $ 25,000 | 287 | 277 | 267 | 258 | 248 | 239 | 230 | 222 | 213 | 205 | 197 | 189 |
| $ 26,000 | 299 | 288 | 278 | 268 | 258 | 249 | 239 | 230 | 222 | 213 | 205 | 197 |
| $ 27,000 | 310 | 299 | 289 | 278 | 268 | 258 | 249 | 239 | 230 | 221 | 213 | 205 |
| $ 28,000 | 322 | 310 | 299 | 288 | 278 | 268 | 258 | 248 | 239 | 230 | 221 | 212 |
| $ 29,000 | 333 | 321 | 310 | 299 | 288 | 277 | 267 | 257 | 247 | 238 | 229 | 220 |
| $ 30,000 | 345 | 332 | 321 | 309 | 298 | 287 | 276 | 266 | 256 | 246 | 237 | 227 |
| $ 31,000 | 356 | 344 | 331 | 319 | 308 | 296 | 285 | 275 | 264 | 254 | 244 | 235 |
| $ 32,000 | 368 | 355 | 342 | 330 | 318 | 306 | 295 | 284 | 273 | 262 | 252 | 242 |
| $ 33,000 | 379 | 366 | 353 | 340 | 328 | 316 | 304 | 292 | 281 | 271 | 260 | 250 |

Number of Years to Reach Goal: 7.00 Years

| Accumulation Goal | \multicolumn{12}{c}{Average Annual Return} |
|---|---|---|---|---|---|---|---|---|---|---|---|---|
| | 1% | 2% | 3% | 4% | 5% | 6% | 7% | 8% | 9% | 10% | 11% | 12% |
| $ 34,000 | 391 | 377 | 363 | 350 | 337 | 325 | 313 | 301 | 290 | 279 | 268 | 258 |
| $ 35,000 | 402 | 388 | 374 | 361 | 347 | 335 | 322 | 310 | 298 | 287 | 276 | 265 |
| $ 36,000 | 414 | 399 | 385 | 371 | 357 | 344 | 331 | 319 | 307 | 295 | 284 | 273 |
| $ 37,000 | 425 | 410 | 395 | 381 | 367 | 354 | 341 | 328 | 315 | 303 | 292 | 280 |
| $ 38,000 | 437 | 421 | 406 | 391 | 377 | 363 | 350 | 337 | 324 | 312 | 300 | 288 |
| $ 39,000 | 448 | 432 | 417 | 402 | 387 | 373 | 359 | 346 | 332 | 320 | 307 | 296 |
| $ 40,000 | 460 | 443 | 427 | 412 | 397 | 382 | 368 | 354 | 341 | 328 | 315 | 303 |
| $ 50,000 | 574 | 554 | 534 | 515 | 496 | 478 | 460 | 443 | 426 | 410 | 394 | 379 |
| $ 60,000 | 689 | 665 | 641 | 618 | 596 | 574 | 552 | 532 | 512 | 492 | 473 | 455 |
| $ 70,000 | 804 | 776 | 748 | 721 | 695 | 669 | 644 | 620 | 597 | 574 | 552 | 530 |
| $ 80,000 | 919 | 887 | 855 | 824 | 794 | 765 | 736 | 709 | 682 | 656 | 631 | 606 |
| $ 90,000 | 1,034 | 997 | 962 | 927 | 893 | 860 | 829 | 797 | 767 | 738 | 710 | 682 |
| $ 100,000 | 1,149 | 1,108 | 1,069 | 1,030 | 993 | 956 | 921 | 886 | 853 | 820 | 788 | 758 |
| $ 150,000 | 1,723 | 1,662 | 1,603 | 1,545 | 1,489 | 1,434 | 1,381 | 1,329 | 1,279 | 1,230 | 1,183 | 1,137 |
| $ 200,000 | 2,298 | 2,216 | 2,137 | 2,060 | 1,985 | 1,912 | 1,841 | 1,772 | 1,705 | 1,640 | 1,577 | 1,515 |
| $ 250,000 | 2,872 | 2,771 | 2,672 | 2,575 | 2,481 | 2,390 | 2,301 | 2,215 | 2,131 | 2,050 | 1,971 | 1,894 |
| $ 300,000 | 3,447 | 3,325 | 3,206 | 3,090 | 2,978 | 2,868 | 2,762 | 2,658 | 2,558 | 2,460 | 2,365 | 2,273 |
| $ 350,000 | 4,021 | 3,879 | 3,740 | 3,605 | 3,474 | 3,346 | 3,222 | 3,101 | 2,984 | 2,870 | 2,759 | 2,652 |
| $ 400,000 | 4,595 | 4,433 | 4,275 | 4,120 | 3,970 | 3,824 | 3,682 | 3,544 | 3,410 | 3,280 | 3,153 | 3,031 |
| $ 450,000 | 5,170 | 4,987 | 4,809 | 4,636 | 4,467 | 4,302 | 4,143 | 3,987 | 3,836 | 3,690 | 3,548 | 3,410 |
| $ 500,000 | 5,744 | 5,541 | 5,343 | 5,151 | 4,963 | 4,780 | 4,603 | 4,430 | 4,263 | 4,100 | 3,942 | 3,788 |
| $ 550,000 | 6,319 | 6,095 | 5,878 | 5,666 | 5,459 | 5,258 | 5,063 | 4,873 | 4,689 | 4,510 | 4,336 | 4,167 |
| $ 600,000 | 6,893 | 6,649 | 6,412 | 6,181 | 5,956 | 5,736 | 5,523 | 5,316 | 5,115 | 4,920 | 4,730 | 4,546 |
| $ 650,000 | 7,467 | 7,203 | 6,946 | 6,696 | 6,452 | 6,214 | 5,984 | 5,759 | 5,541 | 5,330 | 5,124 | 4,925 |
| $ 700,000 | 8,042 | 7,758 | 7,481 | 7,211 | 6,948 | 6,693 | 6,444 | 6,202 | 5,968 | 5,740 | 5,518 | 5,304 |
| $ 750,000 | 8,616 | 8,312 | 8,015 | 7,726 | 7,444 | 7,171 | 6,904 | 6,645 | 6,394 | 6,150 | 5,913 | 5,683 |
| $ 800,000 | 9,191 | 8,866 | 8,549 | 8,241 | 7,941 | 7,649 | 7,365 | 7,088 | 6,820 | 6,560 | 6,307 | 6,062 |
| $ 850,000 | 9,765 | 9,420 | 9,084 | 8,756 | 8,437 | 8,127 | 7,825 | 7,531 | 7,246 | 6,970 | 6,701 | 6,440 |
| $ 900,000 | 10,340 | 9,974 | 9,618 | 9,271 | 8,933 | 8,605 | 8,285 | 7,974 | 7,673 | 7,380 | 7,095 | 6,819 |
| $ 950,000 | 10,914 | 10,528 | 10,152 | 9,786 | 9,430 | 9,083 | 8,745 | 8,417 | 8,099 | 7,790 | 7,489 | 7,198 |
| $1,000,000 | 11,488 | 11,082 | 10,687 | 10,301 | 9,926 | 9,561 | 9,206 | 8,860 | 8,525 | 8,200 | 7,884 | 7,577 |

2400
FIG. 24C

Number of Years to Reach Goal: 7.00 Years

| Accumulation Goal | Average Annual Return | | | | | | | | | | | |
|---|---|---|---|---|---|---|---|---|---|---|---|---|
| | 1% | 2% | 3% | 4% | 5% | 6% | 7% | 8% | 9% | 10% | 11% | 12% |
| $ 1,050,000 | 12,063 | 11,636 | 11,221 | 10,816 | 10,422 | 10,039 | 9,666 | 9,304 | 8,951 | 8,609 | 8,278 | 7,956 |
| $ 1,100,000 | 12,637 | 12,191 | 11,755 | 11,331 | 10,918 | 10,517 | 10,126 | 9,747 | 9,378 | 9,019 | 8,672 | 8,335 |
| $ 1,150,000 | 13,212 | 12,745 | 12,290 | 11,846 | 11,415 | 10,995 | 10,586 | 10,190 | 9,804 | 9,429 | 9,066 | 8,714 |
| $ 1,200,000 | 13,786 | 13,299 | 12,824 | 12,361 | 11,911 | 11,473 | 11,047 | 10,633 | 10,230 | 9,839 | 9,460 | 9,092 |
| $ 1,250,000 | 14,360 | 13,853 | 13,358 | 12,876 | 12,407 | 11,951 | 11,507 | 11,076 | 10,656 | 10,249 | 9,854 | 9,471 |
| $ 1,300,000 | 14,935 | 14,407 | 13,893 | 13,391 | 12,904 | 12,429 | 11,967 | 11,519 | 11,083 | 10,659 | 10,249 | 9,850 |
| $ 1,350,000 | 15,509 | 14,961 | 14,427 | 13,907 | 13,400 | 12,907 | 12,428 | 11,962 | 11,509 | 11,069 | 10,643 | 10,229 |
| $ 1,400,000 | 16,084 | 15,515 | 14,961 | 14,422 | 13,896 | 13,385 | 12,888 | 12,405 | 11,935 | 11,479 | 11,037 | 10,608 |
| $ 1,450,000 | 16,658 | 16,069 | 15,496 | 14,937 | 14,393 | 13,863 | 13,348 | 12,848 | 12,361 | 11,889 | 11,431 | 10,987 |
| $ 1,500,000 | 17,233 | 16,623 | 16,030 | 15,452 | 14,889 | 14,341 | 13,808 | 13,291 | 12,788 | 12,299 | 11,825 | 11,365 |
| $ 1,550,000 | 17,807 | 17,178 | 16,564 | 15,967 | 15,385 | 14,819 | 14,269 | 13,734 | 13,214 | 12,709 | 12,219 | 11,744 |
| $ 1,600,000 | 18,381 | 17,732 | 17,099 | 16,482 | 15,881 | 15,297 | 14,729 | 14,177 | 13,640 | 13,119 | 12,614 | 12,123 |
| $ 1,650,000 | 18,956 | 18,286 | 17,633 | 16,997 | 16,378 | 15,775 | 15,189 | 14,620 | 14,066 | 13,529 | 13,008 | 12,502 |
| $ 1,700,000 | 19,530 | 18,840 | 18,167 | 17,512 | 16,874 | 16,253 | 15,650 | 15,063 | 14,493 | 13,939 | 13,402 | 12,881 |
| $ 1,750,000 | 20,105 | 19,394 | 18,702 | 18,027 | 17,370 | 16,731 | 16,110 | 15,506 | 14,919 | 14,349 | 13,796 | 13,260 |
| $ 1,800,000 | 20,679 | 19,948 | 19,236 | 18,542 | 17,867 | 17,209 | 16,570 | 15,949 | 15,345 | 14,759 | 14,190 | 13,639 |
| $ 1,850,000 | 21,253 | 20,502 | 19,770 | 19,057 | 18,363 | 17,687 | 17,030 | 16,392 | 15,772 | 15,169 | 14,584 | 14,017 |
| $ 1,900,000 | 21,828 | 21,056 | 20,305 | 19,572 | 18,859 | 18,165 | 17,491 | 16,835 | 16,198 | 15,579 | 14,979 | 14,396 |
| $ 1,950,000 | 22,402 | 21,610 | 20,839 | 20,087 | 19,355 | 18,643 | 17,951 | 17,278 | 16,624 | 15,989 | 15,373 | 14,775 |
| $ 2,000,000 | 22,977 | 22,165 | 21,373 | 20,602 | 19,852 | 19,122 | 18,411 | 17,721 | 17,050 | 16,399 | 15,767 | 15,154 |
| $ 2,500,000 | 28,721 | 27,706 | 26,716 | 25,753 | 24,815 | 23,902 | 23,014 | 22,151 | 21,313 | 20,499 | 19,709 | 18,942 |
| $ 3,000,000 | 34,465 | 33,247 | 32,060 | 30,903 | 29,778 | 28,682 | 27,617 | 26,581 | 25,575 | 24,599 | 23,651 | 22,731 |
| $ 3,500,000 | 40,209 | 38,788 | 37,403 | 36,054 | 34,741 | 33,463 | 32,220 | 31,012 | 29,838 | 28,698 | 27,592 | 26,519 |
| $ 4,000,000 | 45,953 | 44,329 | 42,746 | 41,205 | 39,704 | 38,243 | 36,823 | 35,442 | 34,101 | 32,798 | 31,534 | 30,308 |
| $ 4,500,000 | 51,698 | 49,870 | 48,090 | 46,355 | 44,666 | 43,023 | 41,425 | 39,872 | 38,363 | 36,898 | 35,476 | 34,096 |
| $ 5,000,000 | 57,442 | 55,411 | 53,433 | 51,506 | 49,629 | 47,804 | 46,028 | 44,302 | 42,626 | 40,998 | 39,418 | 37,885 |

2400
FIG. 24D

Determining your Retirement Savings Goals

1) What is your goal?
   To have a monthly or annual income flow that covers your expenses or even better, supports your desired lifestyle.
2) What is required to achieve this goal. What is the financial and non-financial cost?

Planning requirements:
   Estimate your income needs in Retirement.
   Estimate income requirement that must be provided through Retirement Savings.
   Estimate the total accumulated Retirement Savings needed to provide for your desired income flow.
   Estimate your monthly cost to accumulate required Retirement Funds to achieve your Goal.

☐ PLANNING STEP 1: ESTIMATE INCOME NEEDED IN RETIREMENT

Estimate the amount of your monthly expenses in retirement based on today's dollars to determine your retirement income requirements? Can you afford a pay cut?

Projected Monthly Expenses         $ 6,000
   Projected Estimated Annual Expenses   $ 72,000 (in today's dollars)
   Number of years until retirement    25
   Projected annual inflation rate   2.5%   (the annual increase in prices)

Monthly inflation-adjusted, retirement income needed   $ 11,124

☐ PLANNING STEP 2: ESTIMATE INCOME THAT WILL BE REQUIRED FROM RETIREMENT SAVINGS

Total Monthly Income Required    $ 11,124

Less: Income Received from:

Pensions    $   -
                   Social Security  $   -
             Part-time Employment   $   -

Total income from Sources other than Savings       $   -

Monthly income Shortfall Required from Savings =   $ 11,124

☐ PLANNING STEP 3: FIGURING HOW MUCH YOU NEED TO ACCUMULATE

How much is needed in savings to provide   $ 11,124   monthly
                                        or   $133,484   annually?
   Depends on:

Number of Years Money Must Last    25
      Average Rate of Return during retirement   7%
      Accumulated Retirement Assets Required    $ 1,155,567

☐ STEP 4: HOW MUCH MUST YOU SAVE MONTHLY TO ACCUMULATE
   What amount must you save monthly to accumulate    $ 1,155,567?

Depends on:

Amount currently invested    $500,000
   Avg. Rate of Return during accumulation period   8%   annually
      Number of years you will be saving    25

Annual amount you should be saving to reach your goal =    $ 11,910
   Monthly amount you should be saving to reach your goal =   $ (2,130)

---

Determining your Retirement Savings Goals

1) What is your goal?
   To have a monthly or annual income flow that covers your expenses or even better, supports your desired lifestyle.
2) What is required to achieve this goal. What is the financial and non-financial cost?

Planning requirements:
   Estimate your income needs in Retirement.
   Estimate income requirement that must be provided through Retirement Savings.
   Estimate the total accumulated Retirement Savings needed to provide for your desired income flow.
   Estimate your monthly cost to accumulate required Retirement Funds to achieve your Goal.

☐ PLANNING STEP 1: ESTIMATE INCOME NEEDED IN RETIREMENT

Estimate the amount of your monthly expenses in retirement based on today's dollars to determine your retirement income requirements? Can you afford a pay cut?

Projected Monthly Expenses         $ 6,000
   Projected Estimated Annual Expenses   $ 72,000 (in today's dollars)
   Number of years until retirement    25
   Projected annual inflation rate   2.5%   (the annual increase in prices)

Annual inflation-adjusted, retirement income needed    $ 11,124

☐ PLANNING STEP 2: ESTIMATE INCOME THAT WILL BE REQUIRED FROM RETIREMENT SAVINGS

Total Monthly Income Required    $ 5,000

Less: Income Received from:

Pensions    $   -
                   Social Security  $   -
             Part-time Employment   $   -

Total income from Sources other than Savings       $   -

Monthly income Shortfall Required from Savings =   $ 5,000

☐ PLANNING STEP 3: FIGURING HOW MUCH YOU NEED TO ACCUMULATE

How much is needed in savings to provide   $ 10,077   monthly
                                        or   $120,924   annually?
   Depends on:

Number of Years Money Must Last    25
      Average Rate of Return during retirement   7%
      Accumulated Retirement Assets Required =    $ 1,408,198

☐ STEP 4: HOW MUCH MUST YOU SAVE MONTHLY TO ACCUMULATE
   What amount must you save monthly to accumulate    $ 1,409,287?

Depends on:

Amount currently invested    $500,000
   Avg. Rate of Return during accumulation period   8%   annually
      Number of years you will be saving    21

Annual amount you should be saving to reach your goal =    $ 17,968
   Monthly amount you should be saving to reach your goal =   $ (1,831)

Income Allocation Adjustment Worksheet

MONTHLY NET INCOME:

| Current Income | Necessary Changes | Preliminary Planned Income |
|---|---|---|
| $ 3,000 | $ 400 | $ 2,600 |

| MONTHLY EXPENDITURES | Current Allocation $ | Necessary Changes + or ( - ) | Preliminary Planned Spending $ | Priority Level — Necessity | Priority Level — Nicety |
|---|---|---|---|---|---|
| HOUSING | | | | | |
| Mortgage/rent | $ - | | $ - | | |
| Home Owner Association/ Condo Fees | | | - | | |
| HOUSEHOLD MAINTENANCE | | | | | |
| Gas /Electric | | | | | |
| Electric | | | - | | |
| Water/sewer | | | - | | |
| Trash Collection | | | - | | |
| Phone | | | - | | |
| Cable/satellite | | | - | | |
| Security Monitoring | | | - | | |
| Pest Control | | | - | | |
| Yard Services | | | - | | |
| Housekeeper | | | - | | |
| Repair and maintenance | | | - | | |
| Decorating and furnishings | | | - | | |
| Consumable Household Items (Non-Groceries) | | | - | | |
| Other ( ) | | | - | | |
| FOOD | | | | | |
| Groceries (Food Only) | | | - | | |
| Dining Out | | | - | | |
| Work Related Lunch | | | - | | |
| Snacks | | | - | | |
| Beverages/Coffee | | | - | | |
| Kid's School Lunches | | | - | | |
| Other ( ) | | | - | | |
| CLOTHING | | | | | |
| Adult's Clothes/Shoes | | | - | | |
| Kid's Clothes/Shoes | | | - | | |
| Dry Cleaning/Laundry/Alterations | | | - | | |
| Other ( ) | | | - | | |
| AUTO/TRANSPORTATION | | | | | |
| Fuel | | | - | | |
| Repairs/maintenance | | | - | | |
| Bus/Subway/Cab | | | - | | |
| Tolls | | | - | | |
| Lease Payments | | | - | | |
| Other ( ) | | | - | | |
| MEDICAL/DENTAL | | | | | |
| Doctors/Dentist | | | - | | |
| Prescriptions | | | - | | |
| Over the Counter Medicine/Vitamins | | | - | | |

| MONTHLY EXPENDITURES | Current Allocation $ | Necessary Changes + or ( - ) | Preliminary Planned Spending $ | Priority Level (Check one) | |
|---|---|---|---|---|---|
| | | | | Necessity | Nicety |
| Other ( ) | | | - | | |
| INSURANCE | | | | | |
| Auto | | | - | | |
| Life | | | - | | |
| Health | | | - | | |
| Home owners/Renters | | | - | | |
| Disability | | | - | | |
| Long-term care | | | - | | |
| PERSONAL GROOMING / MAINTENANCE | | | | | |
| Hair | | | - | | |
| Nails | | | - | | |
| Spa Treatments/Pedicures/Massages | | | - | | |
| Cosmetics | | | - | | |
| Toiletries | | | - | | |
| Other ( ) | | | - | | |
| GIFTS & DONATIONS | | | | | |
| Tithes | | | - | | |
| Church Offerings and Contributions | | | - | | |
| Charities & Charitable Donations | | | - | | |
| Birthdays/Holidays | | | - | | |
| Other ( ) | | | - | | |
| LEISURE | | | | | |
| Music (CD's, Computer Downloads, Satellite Radio, etc.) | | | - | | |
| Event Tickets (Movies/Plays/Concerts/Sporting Events) | | | - | | |
| Computer games/video games/software | | | - | | |
| Vacation / Travel | | | - | | |
| Weekend/Day Trips | | | - | | |
| Sports/Health Club (Including equipment & apparel) | | | - | | |
| Hobbies | | | - | | |
| Socializing (Get-togethers, cookouts, dinner out, drinks) | | | - | | |
| At-home leisure (books, subscriptions, movies, alcohol) | | | - | | |
| Personal Enjoyment (Cigarettes, Beer, Wine, Liquor, Other) | | | - | | |
| Other ( ) | | | - | | |
| FAMILY/KIDS | | | | | |
| Child Support/Alimony | | | - | | |
| Day Care/Camp | | | - | | |
| Tuition | | | - | | |
| Lessons | | | - | | |
| Babysitters | | | - | | |
| Sports | | | - | | |
| Allowances | | | - | | |
| Untrackable Cash for Kids | | | - | | |
| Toys/Games/Gadgets | | | - | | |
| Pet | | | - | | |
| Other ( ) | | | - | | |
| Other ( ) | | | - | | |
| COMMUNICATIONS/COMPUTER | | | | | |
| Cell Phones | | | - | | |
| Internet Access | | | - | | |
| PDA services | | | - | | |
| Other Internet Service Fees | | | - | | |
| Computer expenses | | | - | | |

Spending and Savings Plan
(TOTAL INFLOW MUST EQUAL TOTAL OUTFLOWS)

INFLOWS

Gross Salary      $ -
    Part-Time Work
    Self-Employment
    Bonus/Overtime/Tips
    Child Support
    Pension
    Social Security
    Interest/Dividends
    Other (    )
    Savings Withdrawals
    Investment Redemptions      $ -

TOTAL INFLOWS

CASH OUTFLOWS

SAVINGS AND INVESTMENTS
Savings
    Emergency Fund      $ -
    Savings (General)
    Trip & Vacation Fund      -
    Short Term Goals: (    )      -
    Long Term Goals: (    )      -
    College Saving's Plan
Investment
    Retirement
    Other Investment      -

Total Savings and Investments      $ -

FIXED OUTFLOWS
Debt Obligations
    Mortgage
    2nd Mortgage/Home Equity      -
    Auto loans      -
    Student Loans
    Secured/Unsecured Loans      -
Insurance Premiums
    Auto      $ -
    Life
    Health
    Home owners/Renters
    Disability
    Long-term care
Payroll Taxes
    FICA
    Medicare
Family and Education
    Child Support/Alimony
    Alimony
    Day Care/Camp

2700
FIG. 27A

School Tuition
    Lessons
    Sports
    Other (           )
Housing and Utilities
    Rent
    HOA Fees (includes trash collection)
    House Security System
    Cable/satellite
    Internet
    Trash Collection/Pest Control
    House cleaning
    Other (           )
    Other (           )
Contributions
    Tithes and Offerings
Miscellaneous
    Other (           )
    Other (           )
    Other (           )
    Other (           )
    Other (           )
    Other (           )
    Other (           )

Total Fixed Outflows    $ -

VARIABLE OUTFLOWS
Taxes
    Federal Withholding
    State Withholding
    Real Estate (if paid separate from mortgage)
    Property - Other
Housing and Utilities
    Gas
    Electric
    Water/sewer
    Phone (includes Internet)
    Internet
    Home repairs/maint.
Transportation
    Gasoline
    Parking
    License tags
    Repairs/maint.
    Bus/Subway/Cab
    Tolls/Carpool
Food
    Groceries
    Lunches/Snacks/Sodas
    School lunches
    Dining Out
Clothing
    Parents
    Children
    Dry Cleaning/Laundry
Leisure and Recreation
    Videos/Compact Discs
    Movies/Plays/Concerts/Sporting Events
    Vacation Trips

2700
FIG. 27B

Sport/Hobby/Health Club
    Newspaper/Books/Magazines
    Other Entertainment
Contributions and Gifts
    Religious Contributions
    Charities
    Birthdays/Holidays
    Other: (          )
Medical/Dental
    Doctors/Dentist
    Prescriptions
    Vitamins
Allowances
    Parents
    Children
Personal
    Hair/Nails
    Toiletries
    Tobacco/Alcohol
DEBT OBLIGATIONS
    Credit Card 1 (          )
    Credit Card 2 (          )
    Credit Card 3 (          )
    Credit Card 4 (          )
OTHER (Don't leave anything out)
    Other (          )
    Other (          )
    Other (          )
    Other (          )
    Other (          )
    Other (          )
    Other (          )
    Other (          )
    Other (          )

Total Variable Outflows    $ -

TOTAL OUTFLOWS    $0.00
    *Must = total inflows*

[1] Withdrawals from Savings

[2] Withdrawals and Redemptions from Retirement Accts, Mutual Funds, Stocks, Bonds & CD's

[3] Includes principal, interest, and property taxes

APPARATUS AND METHOD FOR A FINANCIAL PLANNING FAITH-BASED RULES DATABASE

REFERENCE TO RELATED APPLICATION

This application claims priority of U.S. Provisional Patent Application Ser. No. 60/935,002, which was filed on Jul. 20, 2007. The subject matter of the earlier filed application is hereby incorporated by reference.

FIELD OF THE INVENTION

The present teachings relate to devices and methods for providing an electronic searchable database containing faith-based financial management rules, in addition to traditional financial management rules.

BACKGROUND OF THE INVENTION

Conventional methods of financial planning tend to take into considerations a multiplicity of variables, such as, for example, budgeting and cash flow, composition of client's net worth, investment considerations, risk management, taxation and the selection of financial products. In lieu of and in addition to conventional methods of financial planning, some spiritual believers may attempt to deal with matters of finance from a spiritual perspective to achieve financial goals, as well as altruist pursuits.

For example, some Christians believe that their lifestyle, including their financial dealings should portray characteristics consistent with the spiritual principles and scriptural teachings of the Bible. Many faith-based texts contain advice and/or directives regarding how its believers should conduct their financial matters. For example, for Christians, the Bible contains over 2,000 verses addressing money matters and dealing with material possessions.

The Bible, for example, establishes specific principles and instructions related to the financial dealings and beliefs which support Christian values and Christian teachings. Therefore, many Christians believe that Biblical instructions should prevail in their financial dealings. By following these established Biblical financial teachings, some Christians believe will lead to a more enriched and fulfilled personal, spiritual and financial life. These believers often focus solely on their belief in these spiritual principles while discounting the importance of sound conventional financial principles and practices. On the other hand, many spiritual believers have deviated from faith-based financial principles and values, placing little relevance on how these principals relate to the practical matters in their financial dealings and outcomes In either scenario for a spiritual believer, an imbalanced view of financial concepts and ineffective financial management can present economic limitations that stunt both personal progress toward worthy pursuits and overall economic well being. Thus, many spiritual believers who rely predominately on faith and have a limited set of beliefs relating to money, oftentimes, fall into the same financial traps that plague nonbelievers.

It may be desirable to provide an apparatus and method that combine a traditional economic system with a faith-based economic system to facilitate financial planning. It may also be desirable to provide a searchable rules database that contains faith-based concepts and practical applications for financial planning directed towards stewardship. It may further be desirable to provide an apparatus and method that permit iterative alterations based upon proposed or hypothetical fact patterns to provide a user with reliable projections of potential goal planning scenarios based on particular events in the user's financial situation. It may also be desirable that the iterative process allows updates and revisions to the user's financial planning that takes into account actual changed financial circumstances.

SUMMARY OF THE INVENTION

The present invention may satisfy one or more of the above-mentioned desirable features. Other features and/or aspects may become apparent from the description which follows.

A method for providing financial management and planning in an electronic device according to various exemplary embodiments can include using a faith-based rules database to determine a financial and life purposed plan for a user; draft a vision statement for the user based on the financial and life purposed plan; establish personal goals and priorities based on the vision statement for the user; compile financial statement and reports for the user based on financial data of the user; generate a stewardship evaluation report that provides an analysis of management of finances by the user based on faith-based financial management rules and the purposed plan; develop financial plans for the user based on results of the stewardship evaluation report; prepare a spending and savings plan for the user to facilitate the financial plans; and iteratively monitoring and revising the steps of determining, drafting, establishing, compiling, generating, developing and preparing.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 4A shows an example of an expense record log that can be employed in accordance with the faith-based rules database of the present teaching;

FIG. 4B shows an example of a weekly spending report that can be employed in accordance with the faith-based rules database of the present teaching;

FIG. 5A shows an example of a monthly income and expense analysis worksheet which can be employed in accordance with the faith-based rules database of the present teachings;

FIGS. 5B and 5C show an example of a weekly expenditure worksheet which can be employed in accordance with the faith-based rules database of the present teachings;

FIG. 6 shows an example of a purposed plan evaluation tool which can be employed in accordance with the faith-based rules database of the present teachings;

FIG. 7 shows an example of a personal visional statement tool which can be employed in accordance with the faith-based rules database of the present teachings;

FIG. 8 shows an example of a debt ledger which can be employed in accordance with the faith-based rules database of the present teachings;

FIG. 9 shows an example of a debt tracker which can be employed in accordance with the faith-based rules database of the present teachings;

FIG. 10 shows an example of a loan transaction ledger which can be employed in accordance with the faith-based rules database of the present teachings;

FIGS. 11A and 11B show an example of a balanced goals worksheet which can be employed in accordance with the faith-based rules database of the present teachings; and FIG. 12 shows an example of a balanced priorities worksheet which can be employed in accordance with the faith-based rules database of the present teachings;

FIG. 13 shows an example of a financial planning personal goals and priorities worksheet which can be employed in accordance with the faith-based rules database of the present teachings;

FIG. 14 shows an example of a statement of financial position worksheet which can be employed in accordance with the faith-based rules database of the present teachings;

FIGS. 15A-15C show a cash flow statement worksheet which can be employed in accordance with the faith-based rules database of the present teachings;

FIG. 16 shows an example of a budget ratio analysis which can be employed in accordance with the faith-based rules database of the present teachings;

FIG. 17 shows an example of a summary of financial findings which can be employed in accordance with the faith-based rules database of the present teachings;

FIGS. 18A-18C show a finance and financial values evaluation questionnaire which can be employed in accordance with the faith-based rules database of the present teachings;

FIGS. 19A-19D illustrate an exemplary embodiment of the content of a scripture database which can be employed in accordance with the faith-based rules database of the present teachings;

FIG. 20 shows an example of a commitment strategy worksheet which can be employed in accordance with the faith-based rules database of the present teachings;

FIG. 21 shows an example of an income allocation adjustment worksheet which can be employed in accordance with the faith-based rules database of the present teachings;

FIG. 22 shows an example of a financial priorities and goal setting planner which can be employed in accordance with the faith-based rules database of the present teachings;

FIG. 23 shows an example of a goal funding planner which can be employed in accordance with the faith-based rules database of the present teachings;

FIGS. 24A-24D show an example of a target accumulation planner which can be employed in accordance with the faith-based rules database of the present teachings;

FIG. 25 shows an example of a retirement savings goal calculator which can be employed in accordance with the faith-based rules database of the present teachings;

FIGS. 26A-26B show an example of an income allocation adjustment worksheet which can be employed in accordance with the faith-based rules database of the present teachings;

FIGS. 27A-27C show an example of a spending and savings plan which can be employed in accordance with the faith-based rules database of the present teachings.

DESCRIPTION OF THE EMBODIMENTS

Figure 1:
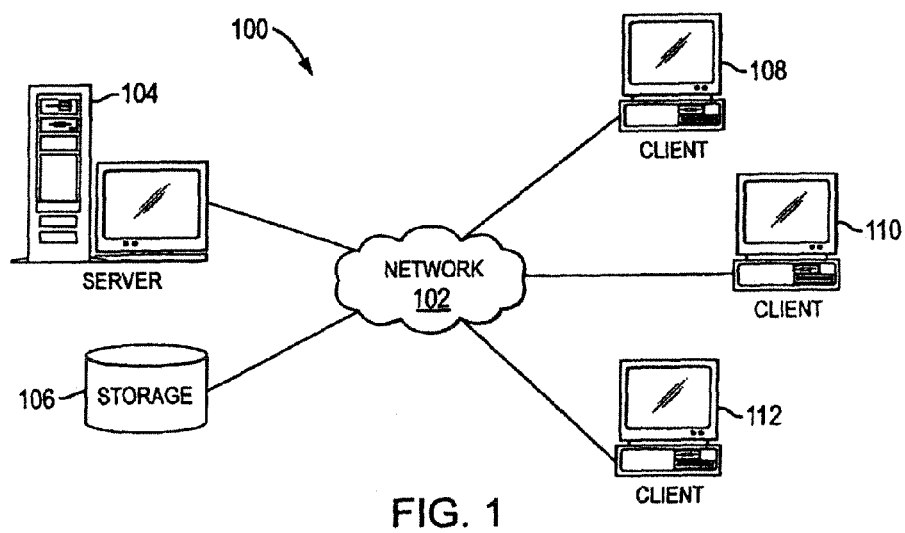
FIG. 1 depicts a representation of a network of data processing systems which employs a faith-based rules database in accordance with the present teachings.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Various embodiments of the method and apparatus described herein provide a software program that combines a traditional economic system with a faith-based economic system, such as, for example, based upon Biblical scriptures and teachings. Various embodiments of the method and apparatus include an electronic searchable database containing faith-based financial management rules, in addition to traditional financial management rules. For example, a Biblical rules database may be automatically searchable by a user to identify a Biblical concept which is applicable to a particular financial situation.

In various embodiments, the method and apparatus may automatically apply rules within the faith-based rules database to an individual user's financial data and altruist pursuits to generate a user specific plan. In various embodiments, the faith-based rules database enables a user to initially establish a vision statement that may include both financial and altruist pursuits. In various embodiments, the faith-based rules database enables a user to input both financial and altruist pursuits to determine whether either one or both are consistent with the user's vision statement and whether the pursuits are financially attainable in view of the user's financial circumstances. Various embodiments of the faith-based rules database provide the user with an iterative process to continuously monitor, update and revise a user's financial plan and altruist pursuits based upon the user's vision statement.

Various embodiments of the faith-based rules database may provide a computerized instructional guide to assist a user with learning financial concepts and strategies. Various embodiments of the faith-based rules database described herein provide a user with interactive course material lesson plans the user may operate and study at the user's convenience. In various embodiments, the lesson delivery system displays a menu of selectable lessons to a user and retrieves the selected lesson for display to the user. Various embodiments of the faith-based rules database enables an interactive application that provides a lesson delivery system that the user can use independently to develop a financial plan and to learn financial principles based upon a particular faith-based text and traditional financial planning techniques.

In various embodiments, the faith-based rules database may be used as a presentation aid to facilitate training. In various embodiments, the faith-based rules database can be administered by a financial advisor who interviews a subject to gather the subject's financial information. Various embodiments provide an iterative application that can be operated by the subject as a mechanism to collect, compile and/or generate preliminary financial data, which is then delivered to the financial advisor for further analysis, for example, to generate a financial plan or tax reporting information.

In various embodiments, the faith-based rules database may include a plurality of different selectable faith-based text, such as, for example, the Bible and the Koran. Thus, a user may search the faith-based rules database to determine how a particular financial situation may be addressed according to several different faith-based texts. Such an embodiment may be beneficial to households where multiple faiths are practiced.

With reference now to the figures, FIG. 1 depicts a pictorial representation of a network of data processing systems 100 in which the faith-based rules database of the present teachings may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. In various embodiments, network data processing system 100 also may be implemented as a number of different types of networks, such as for example, an intranet, a local area network (LAN), or a wide area network (WAN). FIG. 1 is intended as an example, and not as an architectural limitation for the present invention.

Specifically, a data processing system according to the present teachings may be implemented as a server, such as server 104. The data processing system may include electronic and/or program product and instruction means and data for performing financial management and planning processing. In various embodiments, the data processing system may be described as a personal computer, such as a desktop or portable computer. However, as utilized herein, the terms "data processing system," "computer," and tool can be used interchangeably, and are intended to mean essentially any type of computing device or machine that is capable of running a software product, including communication devices (e.g., pagers, telephones, electronic books, etc.) and other computer-based networked devices (e.g., handheld computers, Web-enabled televisions, home automation systems, multimedia viewing systems, etc.). Those skilled in the art will appreciate that the system and method may be practiced with other computer system configurations, including, for example, hand-held devices, multiprocessor systems, microprocessor-based or programmable consumer electronics, minicomputers, and mainframe computers.

A user may enter commands and/or information, as discussed below, into the network data processing system 100 through input devices such as a mouse and keyboard connected to the network data processing system. Other input devices may include a microphone (or other sensors), joystick, game pad, scanner, or the like.

Various embodiments of the system and method of the faith-based rules (FBR) database provide an iterative application that can be operated by the user as a mechanism to collect, compile and/or generate preliminary financial data, which may then delivered to the financial advisor for further analysis, for example, to generate a financial plan or tax reporting information. In lieu of or in addition to delivering the collected information to a financial professional, the user may personally assess, analyze and/or use the compiled information.

The FBR database, in various embodiments, is a system and method that determines how a user views the role of money in the user's life. Money has different functions and importance to all users based on the user's individual priorities and experiences. Most people use some form of currency as a medium of exchange. Thus, each user assigns a value to different tangibles, such as purchasing a home or commodities, and intangibles, such as a college education, which in return guides the choices as to how the user is willing to use his or her money.

The FBR assist users with building a clear financial assessment. The process can be performed electronically during a single session or conducted over several sessions at the user's convenience to complete one or more evaluation tools. For instance, the user may initially determine the information needed for a particular evaluation tool, take a few days or weeks to collect the needed information and then conduct a follow-up session to enter the information. Using the FBR database, users can record in and assess through the use of several evaluation tools many aspects of their financial situations. The FBR may be used to collect and record information in worksheets, reports, tests, assignments, quizzes, ledgers, questionnaires, and financial statements, such as the following examples:

| | |
|---|---|
| Financial Personality Assessment | Financial Planning Personal Goals and Priorities Worksheet |
| Expense Record Log | Statement of Financial Position |
| Weekly Spending Report | Cash Flow Statements |
| Monthly Income and Expenditure Analysis Worksheet | Financial Health Questionnaire |
| Weekly Expenditure Worksheet | Budget Ratio Analysis |
| Assessment Tests | Summary of Financial Findings |
| 1. Values Assessment<br>2. Personality Assessment<br>3. Spiritual Gifts Assessment | |
| Personal Vision Statement | Finance and Financial Evaluation Questionnaire |
| Debt Ledger | Statement of Financial Findings |
| Debt Tracker | Finance and Financial Evaluation Questionnaire |
| Savings Record | Commitment Strategy Worksheet |
| Loan Transaction Ledger | Income Allocation Adjustment Worksheet |
| Balanced Goal Worksheet | Interactive Goal Planning Calculator Applications |
| | 1. Goal Funding Planner<br>2. Target Accumulation Planner<br>3. Retirement Savings Goal Calculator |
| Balanced Priorities Worksheet | Spending and Savings Plan |

The above list is not exhaustive. Those having skill in the art would understand that other assignments or tasks may be employed in conjunction with the present teachings.

The evaluation tool may present questions to the user according to various approaches including: (i) multiple choice questions; (ii) true/false questions; (iii) short answer or "fill-in-the-blank" questions; (iv) essay or "free-form" answer questions; (v) practical problem solving; or (vi) personal interview. Accordingly, the user's responses to the questions may be analyzed, scored, and graded electronically or manually using any known grading, modeling, analytic resolving, character recognition and scoring systems and methods.

One example of a mechanism that may be employed in the FBR database to gather and compile preliminary information is a money personality assessment. The money personality assessment can aid the user to determine whether the user's perspective on financial matters is balanced with principles of financial stewardship and consistent with biblical teachings. On a general level, the present teachings can include collecting information and building a model based on the information. Such a model can then be used to generate a behavioral profile of the user's money choices, which forms a pattern of the user's money personality that best describes the user's attitude towards their personal finances.

Figure 2:
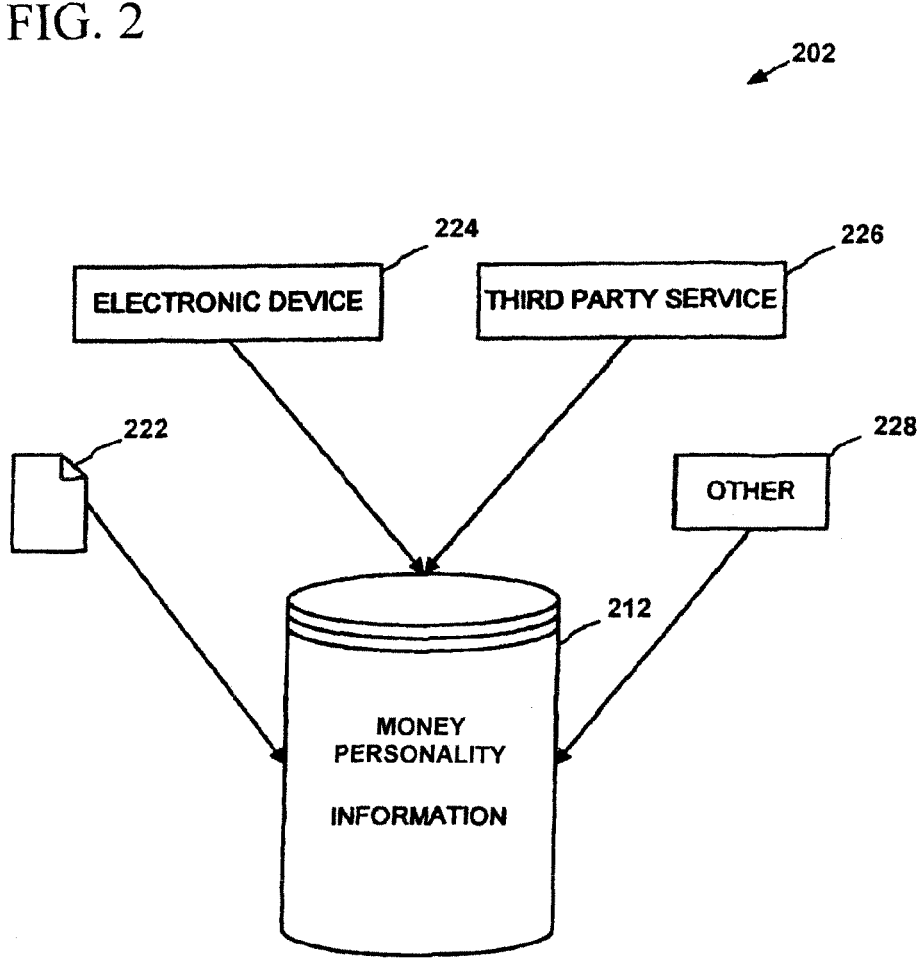
FIG. 2 illustrate a variety of sources for collecting money personality information in accordance with the faith-based rules database of the present teaching.

The money personality information can include any information, such as, for example, personal finance, money management, and budgeting, collected about an individual. FIG. 2 shows a variety of sources 202 for collecting money personality information 212. The money personality information 212 can be stored in electronic (e.g., digital) form in a computer-readable medium (e.g., RAM, ROM, magnetic disk, CD-ROM, CD-R, DVD-ROM, and the like). Possible sources for collecting the money personality information 212 include a paper-based source 222, an electronic device 224, a third party service 226, or some other source 228. The money personality information can include, for example, a user's answers to an on-line money personality quiz. As shown, for example in FIG. 3, the quiz may present questions to the user regarding savings, spending, bills and record keeping, vacations, giving, relationships, retirement, and planning for the future.

Figure 3:
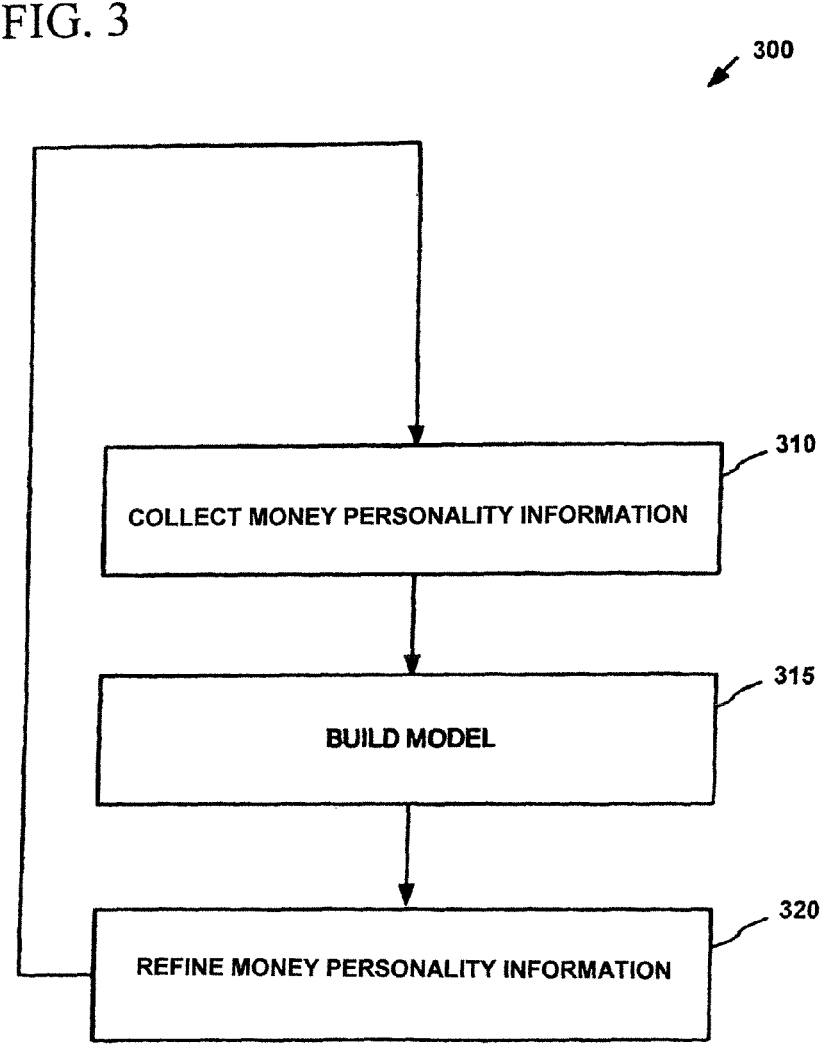
FIG. 3 depicts a behavioral model in accordance with the faith-based rules database of the present teachings.

After the money personality information 212 has been collected in step 310, a behavioral model 315 can be built as shown in FIG. 3. The behavioral model can take a variety of forms, including artificial intelligence-based models. The behavioral model can generate one or more behavioral profiles based on money personality information inputs. Thus, the model can be used to identify the tendencies, priorities, values, and attitudes of the user related to the management of their finances. In practice, the model can be implemented as computer-executable code stored in a computer-readable medium. In step 320, the user's money personality can be subsequently refined as the user develops a reprioritized focus in managing his or her finances.

Figure 4A:
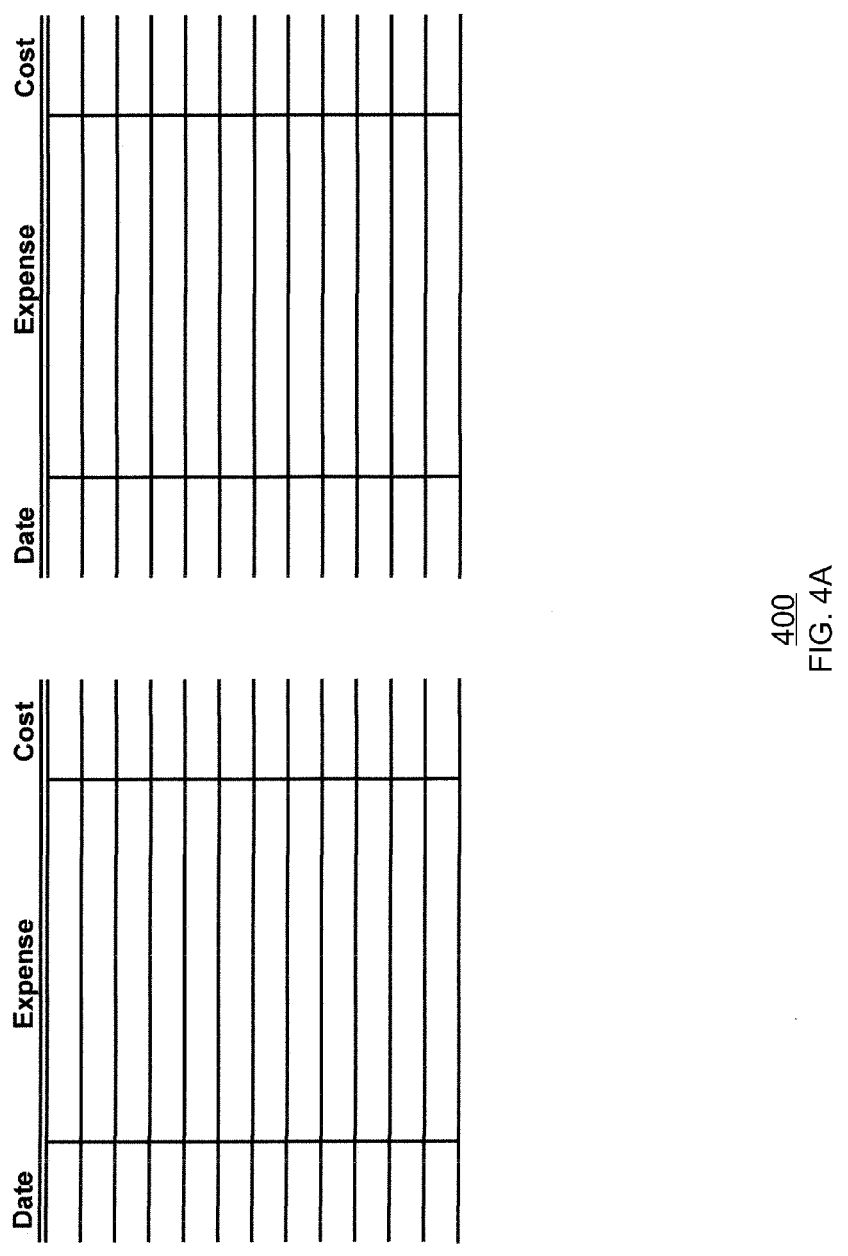

Another mechanism that the FBR database may employ to assist the user to collect preliminary financial information is an Expense Record Log 400 (FIG. 4A), which can be used in a similar manner to the money personality assessment to gather information. Using a computer device connected to a printer, the user may print out and carry the Expense Record Log to accurately track the user's spending activity for a specified time, for example, a minimum of six weeks. Alternatively, the user may employ a software program of the Expense Record Log 400 downloaded or installed within an electronic mobile device, such as a mobile phone, to record and track the user's spending activity. As shown in the example in FIG. 4, the Expense Record Log 400 may permit the user to record impulse and unplanned spending and hard to track cash expenditures. Expenses should be recorded as they are incurred, if possible. The user may compile the data from the Expense Record Log 400 into the Weekly Spending Report 410 (FIG. 4B) to update periodically such as weekly or monthly.

Using the information recorded in the Expense Record Log 400, the user may use the FBR database to update a Weekly Spending Report 410, to determine the total amount spent in each spending categories. The information gathered in the Expense Record Log 400 and the Weekly Spending Report 410 may be used by the FBR database to more accurately prepare a report of all monthly expenses that realistically reflects the user's routine pattern of activities.

As the user uses the FBR in preparation to become a better steward of the user's money and life, it is important to determine what the user's money is doing and how it is contributing to living out the life based upon the user's faith-based beliefs. In various embodiments, the FBR database enables the user to prioritize the user's finances based upon the user's faith-based principles. The process of the FBR enables the user to set a course that focuses the user's plans and finances toward faith-centered goals and priorities. Before charting the course toward the user's faith-based goals and priorities, the process assists the user in determining a realistic current assessment of the financial means with which the user is working with based on the user's monthly income and available assets.

To accurately determine the user's monthly income, the user can use the FBR to complete a Monthly Income and Expense Analysis 500, as shown, for example, in FIG. 5A. Each category for a given expense, in FIG. 5A, tracks expenses for a predetermined time. Using the FBR database, the Income and Expense Analysis 500 can be automatically adjusted to track expenses for another time period, such as, every three months. As shown in FIG. 5A, the Monthly Income and Expenditure Analysis 500 can include categories, such as, for example, incoming provisions, home and household maintenance, food, clothing, transportation, medical/dental, insurance, personal grooming/maintenance, debt obligations, and savings. As the user records the amount spent on an expense, if the expense recurs at intervals other than monthly, the user must average the expense to reflect a monthly allocation amount. If the user has not maintained well-documented income and spending records, the user may enter estimates of the expenses into the FBR database based on the user's typical activities and spending patterns. The user should compile and provide accurate figures into the monthly income and expense, because the information provided herein may be used in other stages of the process.

To assist with accuracy in compiling monthly expenditure totals, the user can use the Weekly Expenditure Worksheet 510 (FIG. 5B) which will enable the user to more easily organize, manage, and track all expenditures on a systematic and ongoing basis. The weekly figures can then be used to complete the Monthly Income and Expenditure Analysis 500 that may be used to prepare the user's spending plan.

Various embodiments of the FBR databases serve as a guide for use by the users in evaluating their individual attributes that define each user's purposed plan. Various faith-based texts teach that each individual's life purpose is pre-destined, and each individual possesses innate traits and attributes to achieve his or her purposed plan. The FBR database may provide users with a Purposed Plan Evaluation Tool 600, which may be displayed to the users on a computer screen in various formats, such as, for example, as shown in FIG. 6 to enable each user to define his or her core values, character and passions. The evaluation tool 600 may be used in hard copy or print medium. It is also contemplated that the evaluation tool can be presented in any suitable medium, including electronic media via a computer.

In situations where users are uncertain about their purposed plan and are unable to complete the exemplary tool in FIG. 6 at this stage of the process, the FBR database enables each user to perform a personal inventory assessment to determine the user's innate attributes and aid the user to define his or her purposed plan. The personal inventory assessment, according to various embodiments of the present teachings, may provide at least one evaluation tool and/or evaluation technique to profile the user's core values, character, and passions. The personal inventory assessment evaluation tool may also be used in hard copy or print medium. Preferably, the evaluation is administered and scored by computer. A suitable computer program can automate the steps of the evaluation. Thus, for example, a suitable computer program records all answers provided by the user, calculates totals of the values of the answers chosen by the user to questions, and establishes and displays a preliminary personal inventory profile indication to the user after the user has answered all the questions.

Using the profile of the Purposed Plan 600 provided in FIG. 6 or derived according to the personal inventory assessment, the FBR can direct the user to corresponding passages within the appropriate faith-based text based on the user's profile. In some embodiments, the FBR database can use the profile to indicate a path for the user to achieve his or her purposed plan.

In performing the personal inventory assessment, the FBR database may assess several user traits and characteristics, such as, for example, core values, gifts, skills, abilities, talents, interests, experiences and personality. The FBR may contain a database containing definitions that define indicators of each examined characteristic and/or trait. For example, the personal inventory assessment may examine the characteristic of the user's leadership skills. The indicators defined within the database for the characteristic of "leadership" may include submissive, low assertive, high assertive and aggressive. Based upon the answers that the user provides, the personal inventory assessment test compares the answers provided by the user to the indicators to calculate the user's profile for a specific characteristic and/or trait. Then, the personal inventory assessment produces and displays a profile of the user's innate characteristic and/or traits as a measure in comparison to the previously defined characteristics and/or traits. The profile may be presented to the user as a written report, a computer-generated graph, a numerical point system, alphabetically grading scale and/or a combination thereof.

The personal inventory assessment may include individual assessment tests, such as a values assessment test, a personality assessment test and/or a spiritual gifts assessment test. Various assessment tests are well known. Such commercially available assessment tests, in electronic and/or paper form, may be used in conjunction with the FBR of the present teachings. For example, the values assessment test may use the "Identifying Your Core Values" Assessment Test provided by Intuitive Life Coaching, "Identifying Your Values" Assessment Test provided by Touchpoint Coaching, and "Do You Know Where You're Going" provided by Revolution Health Group. The personality assessment test can be accomplished using, for example, standard industry personality typing tests such as the Myers, Briggs Personality Assessment Test or the Keirsey, Bates Temperament Sorter, published in 1978 by David Keirsey and Marilyn Bates. The spiritual gifts assessment test may be carried out using, for example, "An On-Line Spiritual Gifts Test" available via the Internet at www.kodachrome.org/spiritgift/.

Using the FBR database, the user can develop a vision statement based on the responses provided by the user in the purposed plan assessment 600, for example, in FIG. 6 and/or the personal inventory assessment, described above. The vision statement will represent the person that the user believes that he or she should be striving to become. The vision statement may serves as a personal constitution that defines the user's most closely held values and aspirations. The FBR database enables the user to consider core values, character and passions and to envisage and to state a desired personal vision of the future that the user hopes to achieve. The Personal Vision Statement 700, as shown for example in FIG. 7, may address several issues, such as, for example, "Who are you?" "How do you see yourself?" and "Envision the person who you are striving to become?" The results of the Personal Vision Statement 700 may be used by the FBR in additional tasks, lessons or assignments to guide the user in evaluating whether his or her plans and current activities are in alignment with the user's personal vision statement.

The FBR database also serves as tool to assist the user in performing financial planning as life planning. According to the present teachings, the user cannot carry out his or her purposed plan effectively without planning. Planning for personal attainment cannot be done in isolation of planning the user's finances. Determining how much the user will need and when the user will need it is essential in assuring successful progress along the path towards his or her purposed plan. For example, there are over 2,000 Biblical Scriptures dealing with issues of money and material possessions. The FBR database provides each user with a better understanding of how to harmoniously operate within the faith-based laws and principles of finance and financial management while striking a balance in order to reap the rewards of stewardship and effective money management and planning.

Figure 9:
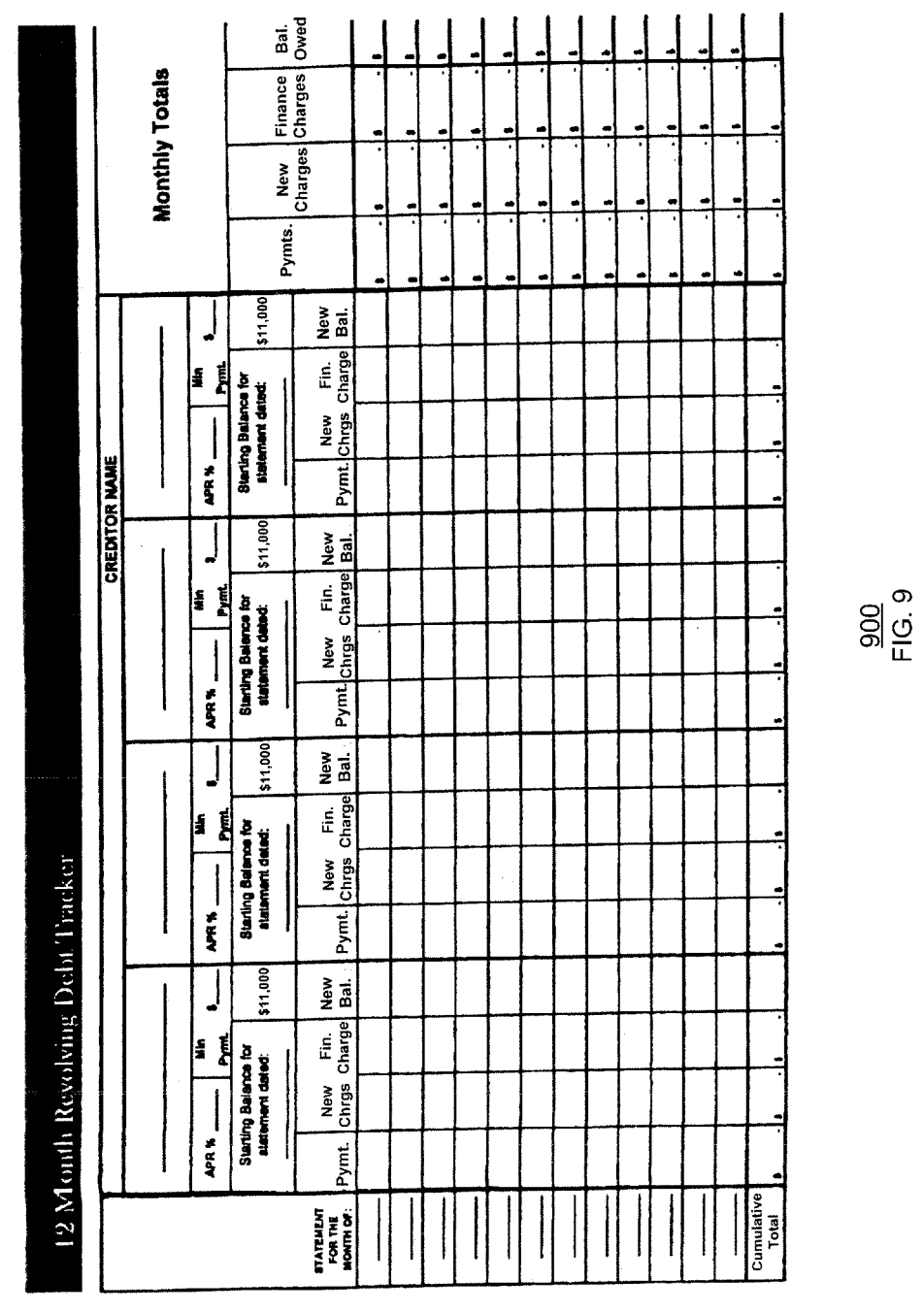

To assist the user in furthering his or her purposed plan, the FBR database provides an automated personal financial tracking system. The financial tracking system may include one or more ledgers for posting monetary transactions in the forms of debits and credits. The ledgers may be used to receive data inputs in the form of electronically recorded financial transactions. For example, the financial tracking system may include a debt ledger 800 (FIG. 8), a debt tracker 900 (FIG. 9), a loan transaction ledger 1000 (FIG. 10), and a savings record (not shown). The above list is not an exclusive one. Those having skill in the art would understand that other financial tracking and reporting systems and schemes may be employed. Oftentimes, it is difficult for the user to gain control over his or her financial affairs and achieve any measurable financial and personal goals without having an accurate assessment of the user's current expenditures. As a user typically evaluates his or her expenses based on a monthly income analysis, often there are overlooked areas of spending such as spending financed with credit and debt and spending from savings account withdrawals. Using the financial tracking system to report and record the information requested, for example, in FIGS. 8-10, the FBR database enables the user to examine his or her recent history of credit spending, savings withdrawals, and account transfers in order to obtain a better understanding of how the user is using his or her money.

The information regarding the user's savings and debt transaction can assist the FBR database to more accurately identify the user spending patterns. Therefore, using the information recorded in the ledgers such as for example in FIGS. 8-10, the FBR database may automatically update the user's monthly income and expenditure analysis in FIG. 5. The ledgers in FIGS. 8-10 can also be manually updated by the user or by a financial adviser.

The FBR database further enables the user to establish goals and priorities so that the user can more efficiently and effectively develop his or her financial plans. The FBR database uses the Stewardship Focus Financial Planning Process™, (SFFP Process), which emphasizes that individuals have a responsibility to manage their finances to achieve their purposed plan and the responsibilities and assignments that are under the individual's charge. As a steward using the FBR database, the user is able to determine areas of faith-based responsibilities and oversight. One principle of the SFFP Process is that financial resources, along with other resources, should be properly stewarded and effectively managed to accomplish the goals of the user's purposed plan. To develop the user's financial plans, the user should have a target destination. These are the user's goals. The FBR enables users to insure that their priorities are consistent with their goals and aids to plot a path detailing targeted tasks to achieve each user's purposed plan.

The FBR database permits the user to associate a financial value to tangibles, such as material possessions that the user wishes to acquire, and non-tangibles that the user wishes to achieve or that relate to how users manage their lifestyles, such as poor time management skills and procrastination. Repeated occurrences of such events can form a habit, which can have deleterious effect on a user's financial well-being. For example, repeated tardiness by the user at his or her job may be cause for permanent dismissal.

The FBR database may enable users to list their goals in a Balanced Goals Worksheet 1100 as shown for example in FIG. 11 and list their priorities in the Balanced Priorities Worksheet 1200 shown for example in FIG. 12. According to the exemplary embodiment in FIG. 11, the FBR database may prompt users to enter their short term goals (0-1 year), mid term goals (1-5 years) and long term goals (greater than 5 years) in categories such as spiritual, home environment, work/career, relationships, and finance.

Various embodiments of the FBR may enable users to address their personal priorities such that their financial choices are balanced with daily living expenses and the allocation of funds to reach their short- and long-term goals. The FBR database assists the user to maintain a visual record as a reminder of what issues takes precedent in managing the areas that users are to steward. Should a user stray and gravitate towards trivial pursuits, the priority worksheet 1200 in the FBR database, for example, in FIG. 12 may serve as a tool to identify the areas that the user should establish as focused priorities. Similar to the goals worksheets in FIGS. 11A and 11B, the balanced priorities 1200 may address categories such as spiritual, home environment, work/career, relationships, and finance.

After users enter their goals and priorities, the FBR database can assist the user to rank the goals and priorities of the users. In some embodiments, the user may elect to input and rank their goals and priorities using a Financial Planning Personal Goals and Priorities Worksheet provided in the software of the FBR database, as shown for example in FIG. 13. In some embodiments, using the information provided in FIGS. 11 and 12, the user may elect that the FBR database generates an automated rank of their goal and priorities to obtain their purposed plan. A comparison between the user-generated ranking and the automated-generated ranking can also be performed.

The FBR database may demonstrate key financial concepts through written and video discussions and illustrations to provide users with an understanding of how money works according to specific fixed principles. According to the SFFP process, lack of financial knowledge can be one of several obstacles which hinders an individual's financial planning success. The FBR database may include one or more financial calculators that provide practical examples illustrating the hidden financial impact of routine choices that an individual makes on a daily basis. The financial calculators may illustrate, for example, the following concepts:

1. The impact of compounding
2. The time value of money
3. The geometric accumulation principle
4. The impact of inflation
5. The impact of debt
6. The impact of mismanaged credit
7. The importance of investing Using the financial calculators of the FBR database, users can perform numerous scenarios, changing the variables to generate and understand the different outcomes. By modifying different variables to change the outcomes, users will be able to realize how important it is to be aware of the financial implications of spending, saving, borrowing and investing decisions.

Personal financial statements may be prepared in various embodiments of the FBR database by the user electronically or manually completing a financial report, for example, as shown in FIGS. 14 and 15A-15C. The FBR database may include two primary personal financial statements such as, for example, a Statement of Financial Position 1400 and a Cash Flow Statement 1500. The Statement of Financial Position 1400 may detail an individual's financial status at a set date noted on the statement. The statement may show a snapshot of an individual's net worth at that set date. The statement may show categories of assets that an individual owns and categories of liabilities for what the individual owes. Namely, the statement may show valuation information in two main categories for each term period covered. To analyze a user's financial status, the FBR database may examine the financial numbers related to two categories: assets and liabilities.

In the exemplary embodiment of FIG. 14, the assets may relate to users' cash/cash equivalents, invested assets and use assets, and the liabilities address users' credit card balances, auto loans, personal loans, mortgage balances, etc. As noted on statement 1400, a user's assets minus his or her liabilities determines the user's net worth. Information recorded The Statement of Cash Flow 1500 reports the flow of cash into and out of an individual's financial portfolio. The Cash Flow Statement 1500 may be used to determine an individual's sources and uses of cash for a stated time period. The Cash Flow Statement 1500 may be determined on a monthly, quarterly and/or an annual basis or a combination thereof. The cash flow in the example of FIGS. 15A-15C is shown on an annual basis. Both the Statement of Financial Position 1400 and the Cash Flow Statement 1500 may be used by the FBR database to guide users to relevant scriptural teachings that will help the user to address identified shortcomings and challenges involved in the user's financial stewardship. Evaluation of these personal financial statements reveal more accurate data for the user to assess and establish more realistic and measurable goals and to realign the user's priorities to further plot the user's path to reaching the users' purposed plan. The reassessment facilitated by the information recorded in the personal financial statements enables the user to make plans related to the user's income, spending, and savings that allows the user to steward according to faith-based principles and the user's purposed plan.

As previously noted an individual's overall financial health is comprised of many elements, such as, for example, whether an individual has three months of living expenses saved to cover emergencies; whether an individual is participating in his or her company's 401(k) or pension program; whether an individual saves or invests beyond his or her retirement plan and emergency fund; whether an individual has life insurance and disability insurance; whether an individual has a will, whether an individual spends less than 25 percent of his or her income on rent or mortgage, whether an individual pays his or her credit cards in full each month, and whether an individual pays all of his or her bills in full each month. Typically, such questions are present as a quiz or test to user to determine a user's financial health. Various types of financial health quizzes exist to assist a user to target areas that need further work. For example, financial health quizzes that focus on a user's overall financial health can be found via the Internet at www.finishrich.com/free_resources/fr_financialtest.php and www.msmoney.com/mm/financial_health/msm_finhealth_test.htm. Financial health quizzes that are directed to a specific financial area, such as credit and debit manage, can be found via the Internet at www.smartcredittips.com/main.html and www.usnews.com/blogs/alpha--consumer/2008/1/31/a-financial health-quiz.html. The present teachings of the FBR database may employ various financial health quizzes, including one or more of the above quizzes, to determine a user's financial health from a stewardship perspective.

The FBR database enables users to examine their finances from a quantitative perspective to determine the economic soundness of their financial situation. This feature allows users to identify strengths and to uncover weaknesses and vulnerabilities in their financial situations. To aid in performing the quantitative assessment, users may complete a Budget Ratio Analysis 1600 (FIG. 16) using the FBR database. As shown in FIG. 16, this analysis tool 1600 provides insight into whether a user's spending is in relation to his or her income for various budget categories and whether such spending is considered to be within reasonable normal ranges.

If the user expends money over- or under acceptable guidelines for a particular category, this should alert the user that further evaluation is needed to determine whether the user's expenditure ratio is warranted or reasonable for the user's particular circumstances. If the user's expenditures are in the extreme high or low ranges, using the FBR database, the user may wish to make adjustments in those areas to improve his or her overall finances.

By using one or more of the analysis, calculations or worksheets described above, the FBR permits users to determine how well they are following the principles of faithful stewardship. For instance, users may review the information collected and recorded in one or more of the followings:

1) Monthly Cash Flow Statement
2) Annual Cash Flow Statement
3) Statement of Financial Position
4) Debt Ledger
5) Savings Record
6) Financial Ratio Analysis
7) Personal Vision Statement
8) Balanced Priority Worksheet
9) Financial Planning Personal Goals Worksheet While reviewing the information, each user may focus on asking questions such as "What story would be written about the user if someone only had his or her financial reports and assessments as a basis for the story?"; "What does the data say about the user—his or her use of money, the things that the user values most, and the user's financial priorities?"

Based upon the user's review, the user may draft a Summary of Financial Findings 1700 using the exemplary tool in FIG. 17. The Summary of Financial Findings 1700 may be a very short paragraph that summarizes your review of your financial status. By using character recognition, intelligence-based modeling and historical databases within the FBR database to recognize input characters and assign corresponding quantitative values, the Summary of Financial Finding 1700 can be used to perform a comparison between the user's own financial summary and any other automated computations performed by the FBR database.

Furthermore, users can employ the FBR database to complete the Finance and Financial Evaluation Questionnaire 1800, as shown for example, in FIG. 18. The Finance and Financial Evaluation Questionnaire 1800 may consist of a series of questions pertaining to the user's personal finances and covering several of the previously discussed topics. Thus, the FBR database may automatically incorporate some of the users previously provided input as responses into the Finance and Financial Evaluation Questionnaire 1800. The Finance and Financial Evaluation Questionnaire 1800 exercise will help the user to assess whether the values, behaviors and actions that shape his or her current financial life conform to the relevant verses or passages from a faith-based text, such as the Scriptures of the Bible.

The questions of the Finance and Financial Evaluation Questionnaire 1800 may be categorized, for example, into four key areas to help the user gain insight into the areas of stewardship that the user may need to focus his or her primary attention. These categories may include for example:

1. Evaluating our Earthly Economics (Current Finances)
2. Reflecting True Values and Priorities (Personal and Faith-based Values)
3. Disciplining our Habits and Tendencies (Behaviors and Actions)
4. Confronting our Attitudes and Motives (Your Thought Life)

Provided within the FBR database may be a Scriptural Database 1900 including topics that correspond to the categories of the Finance and Financial Evaluation Questionnaire 1800. The user's response to the Finance and Financial Evaluation Questionnaire 1800 enables the FBR database to determine the faith-based categories where the user needs improvement. The FBR database may access, retrieve and display to the user on an electronic display, such as a computer screen, relevant verses of faith based-text based upon the responses provided by the user in the Finance and Financial Evaluation Questionnaire 1800. Further, the Scriptural Database 1900 may provide the user with scripture and examples from the faith's written teachings that will enable the user to gain a proper faith-based perspective in various areas of interest, including financial and personal matters.

After the user has reviewed the scriptures and examples provided by the Scriptural Database 1900, the FBR database may prompt the user to review his or her Financial Personality Assessment described above to determine whether it should be updated or modified in view of the new information learned based upon the results generated by the FBR database. If such modifications are appropriate, the FBR database may further assist the user to evaluate which areas should be changed and how such changes may effect how the user's financial matters in the future.

Based on the findings in the evaluation exercises in FIGS. 18 and 19, the FBR database permits the user to document his or her commitment to address the issues needed to become a better steward by completing, for example, a Commitment Strategy Worksheet 2000 shown in FIG. 20. The Commitment Strategy Worksheet allows users to document those things that they recognizes about their financial life that needs to be addressed to improve their stewardship. This worksheet may also help users understand their true commitment to the work, requirements, sacrifices and adjustments that need to be made to facilitate the needed changes.

Based upon the review of their financial status, the FBR database permits the users to formulate specific goals and financial plans. The FBR database enables users to reprioritize their current spending. After the user gains some insight into how they wish to refocus the use of their money, the FBR database can assist the users to determine if they can produce any additional discretionary income by reducing their spending. Using the information recorded in the Income and Expenditure Analysis Worksheet 500 (FIG. 5), the FBR may automatically complete the Income Allocation Adjustment Worksheet 2100 (FIG. 21). The Income Allocation Adjustment Worksheet 2100 reassess the users' priorities and determines how users can reallocate their income provision towards a plan for more effective stewardship.

This feature of the FBR database may accomplish the following:
1. Help users to assess their priorities in their current spending and determine the adjustments they are willing to make within their current budget to free-up and/or earn additional income.
2. Establish new allocation amounts within a user's current expenditure categories.
3. Calculate the total additional income to be made available for new priorities and goals.
4. Calculate the amount of any income shortfall that must be planned for and corrected.

To assist with the completion of the above exercises, the FBR database may automatically incorporate the information recorded in the following completed reports:
1. Summary of Financial Findings
2. Commitment Strategy Worksheet The FBR database also enables users to revisit their priorities and goals. Based upon the previous calculations and assessments, users know the worth of their financial assets and have a better insight into the amount of their uncommitted discretionary income. Additionally, based on what users have learned about stewardship, about themselves, and their finances, it is likely that each user has developed some new ideas and strategies that may require revision of their Financial Planning Personal Goals and Priorities Worksheet 1300 (FIG. 13).

In order to revise the Financial Planning Personal Goals and Priorities Worksheet 1300 (FIG. 13), users may first review the Balanced Goal Worksheet 1100 (FIGS. 11A and 11B) and the Balanced Priorities Worksheet 1200 (FIG. 12). Deletions from and additions to these worksheets can be made based upon the user's new insight into and understanding of their true financial circumstances. If evaluation of a user's Personal Financial Statements 1400 and 1500 (FIGS. 14 and 15) reveal any weakness and vulnerabilities which places his or her financial health and financial future in jeopardy, the user should include those concerns under "Finance" on the applicable worksheet. Users may also refer to the Commitment Strategy Worksheet 2000 (FIG. 20) and Summary of Financial Findings 1700 (FIG. 17) previously completed to determine whether any issue listed therein should also be included within the Balanced Goal Worksheet 1100 and the Balanced Priorities Worksheet 1200.

The FBR database provides a Financial Priorities and Goal Setting Planner 2200, because, in order to successfully obtain goals, the users need to be specific in formulating a plan to fund their goals. Users may select from worksheet 1100 their top 5 highest priority goals for each time frame; short-, intermediate-, and long term. Theses goals may be entered in the Financial Priorities and Goal Setting Planner 2200 (FIG. 22). This planning tool is similar in format to the Financial Planning Personal Goals and Priorities Worksheet 1300, but requires additional information.

In order to plan financially for goals, goals must be measurable. Thus, the FBR database provides a mechanism to assign a dollar cost figure to each goal. This requires each goal be quantified as a monetary amount. Using information stored within its database or through research conducted via connecting to the Internet, the FBR may automatically quantify the value of each goal. Alternatively or in conjunction with the automated values, users may modify and/or manually research and enter their own values. Without a defined target users may not be able to effectively establish a financial course of action. The quantified monetary values for each value may be entered in the Financial Priorities and Goals Setting Planner Worksheet 2200 in FIG. 22.

An additional feature of the FBR database enables users to determine their monthly income commitments. This feature assists users in determining a realistic time frame in which they can achieve their goals. The Goal Planning Calculator 2300 (FIG. 23) enables users to determine if their goals are realistic and attainable. Transforming a goal into a reality requires that the users have the needed cash or assets when the time arrives to achieve the specific goal. The Goal Funding Planner 2300 allows users to determine within a set time frame, the savings commitment that must be made to pay for the goal. Multiple goals generally must be planned for simultaneously so that users can coordinate their financial commitments to fit within their budget. The Goal Funding Planner 2300 allows multiple goals to be examined simultaneously so that users get an idea of the total income commitment required if trying to achieve each goal by its target date. In the example shown in FIG. 23, the Goal Funding Planner 2300 illustrates simultaneous tracking and monitoring of three goals. This feature may help users prioritize which goals are most important.

The FBR database may also include a Target Accumulator Planner Worksheet 2400 (FIG. 24) that, on the other hand, allows users to key in different time frames to determine the monthly savings required to reach a given accumulation target. Both worksheets 2300 and 2400 may allow adjustments for the rate of return assumptions since variances in rates of return can significantly impact planning of long-term accumulation goals.

Using the automated worksheets 2300 and 2400, users may test several different scenarios to determine what goals are attainable within their financial circumstances and time specifications so that the users can establish the priority of their short-, intermediate-, and long-term planning goals.

The FBR database, in various embodiments, may provide a Retirement Savings Goal Calculator 2500 such an example is shown in FIG. 25. There are some goals where neglect will potentially result in such unfavorable consequences, that they must be made a priority. For most people, planning for retirement is such a goal that it must be given priority in their financial focus. The FBR database enables the users to assess the cost of this goal by completing the Retirement Savings Goal Calculator 2500.

At this step in the process, the FBR database may prompt users to assign a "Priority Ranking" on the Financial Priorities and Goals Setting Worksheet 2200 for each time frame category.

After addressing your priorities, prioritizing which priorities are most important and determining the monthly cost commitment, the user may include these amounts on the Income Allocation Adjustment Worksheet 2600 (FIG. 26) under "Necessary Changes". This will reduce the amount of discretionary surplus for a user and determine how much the user has remaining to finish planning for his or her goals.

After the deduction in a user's discretionary income, the user may wish to determine how to allocate the balance of his or her discretionary income to the user's goals. This information may be entered in the "Necessary Changes" column for the appropriate expenditure category on the Income Allocation Adjustment Worksheet 2600. This information may also be automatically entered as the "Amount to Save per Month" on Financial Priorities and Goals Setting Worksheet. 2200. With these amount determined, the user may enter estimated target dates about his or her goals into the "Full Funding Target date" and "Target Start Date" sections of the Financial Priorities and Goal Setting Worksheet 2200.

Returning to the Income Allocation Adjustment Worksheet 2600, users may now compute the last column to determine their Preliminary Planned Spending. This information will be incorporated into the Spending and Savings Plan 2700 (FIG. 27), which may be used to assist the users in plotting a course for directing their stewardship plan.

At this stage in the process, the FBR database has enabled the users to complete the process of determining how their money will be used to further their purposed plans. Next the FBR database may guide users with the preparation of a Spending and Savings Plan 2700 that will help keep their finances directed on a path to accomplish their purposed plans. Some of the goals of the Spending and Savings Plan 2700 are to help users live within their means, spend less than they earn, eliminate and manage debt, establish a surplus of discretionary income, accumulate sufficient savings for unforeseen emergencies, future needs and opportunities, while still achieving the users' goals. With, these goals considered as input factors, the FBR database provides a cash flow statement format for users to create their Spending and Savings Plan 2700. As previously discussed, cash flow reporting examines the inflows and outflow of the users' income funds to determine how their money is used and what are the revenue sources. In some embodiments of the FBR database when formulating the Spending and Savings Plan 2700, the method may eliminate sources other than cash flow so that credit spending is not relevant. As users plan their stewardship of finances according to the SFFP process practiced in the FBR database, users employ a cash flow planning method that avoids the use of credit spending, establishes parameters to live within their means, and avoids the traps of debt. The majority of information needed for the Spending and Savings Plan 2700 may be obtained from the Income Allocation Adjustment Worksheet 2600. However, in comparison, the example of the cash flow format of the Spending and Savings Plan 2700 shown in FIG. 27 requires that users use their gross income. Therefore, in this example, any deductions that were netted out of gross payments must be included in the amounts for their applicable spending categories.

The Spending and Savings Plan 2700 is not a stagnant document. The initial calculation of the Spending and Savings Plan 2700 is based on a user's situation, priorities and goals regarding the user's current life plan and finances. As the user's plans progress, his or her spending focus will need to evolve to accommodate such progression. Thus, constant monitoring and adjusting, if necessary, of some or all aspects of a user's financial portfolio and purposed plan should be performed periodically. Some aspects may be monitored, reviewed, revised, and updated on a more frequent basis, for example, on a monthly basis. While a more comprehensive review of other aspects may be performed on an annual basis.

Figure 28:
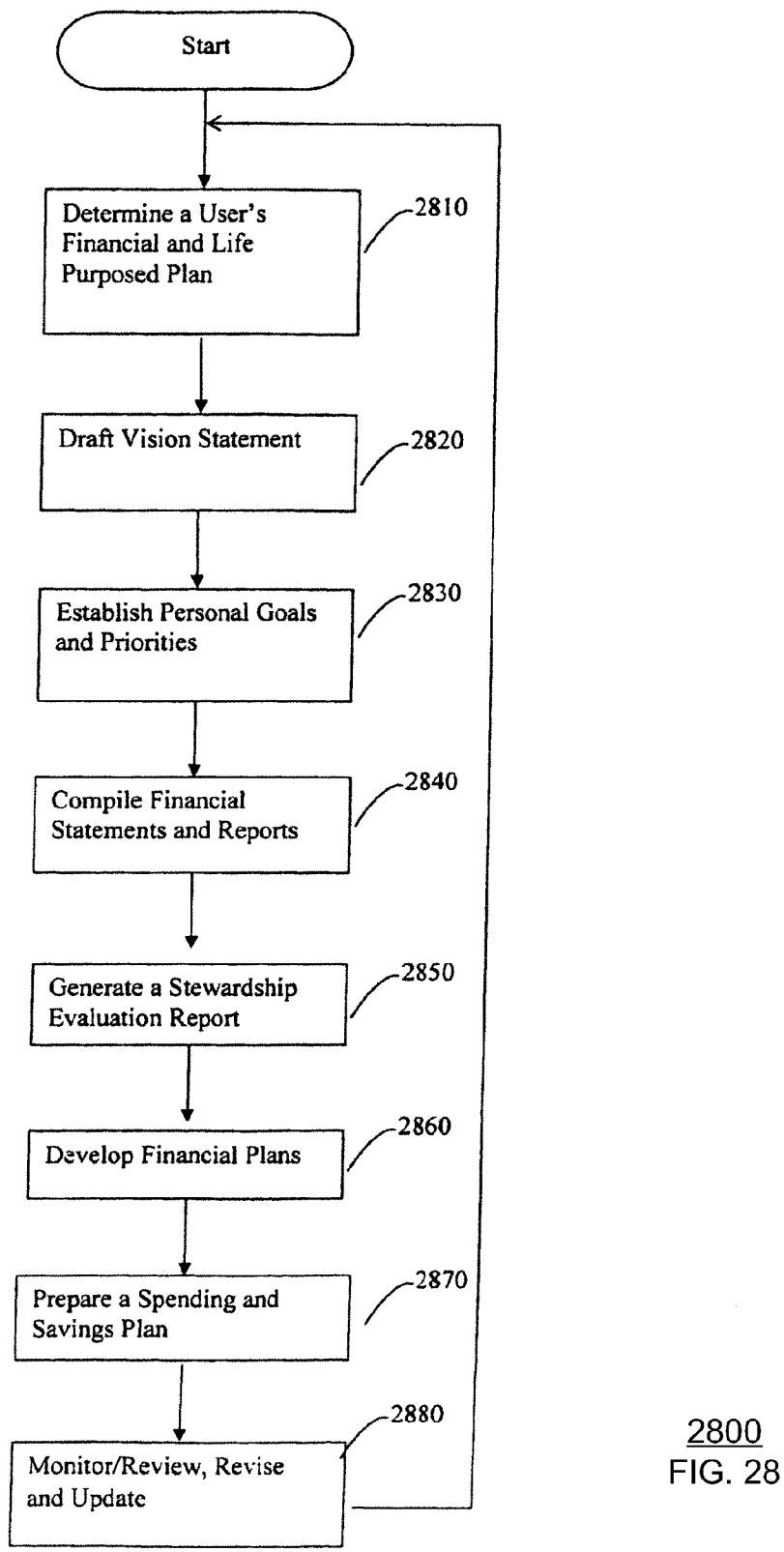
FIG. 28 is a flowchart illustrating an example of a general overview of a process used in a financial planning and management tool to implement the FBR database.

FIG. 28 is a flowchart illustrating an example of a general overview of the process 2800 used in a financial planning and management tool to implement the FBR database described above. In step 2810, a user initiates the FBR database application to assist the user in determining his or her financial and life purposed plan. The process assists the user to draft a vision statement (step 2820); establish personal goals and priorities (step 2830); compile financial statements and reports (step 2840); generate a stewardship evaluation report (2850); develop financial plans (step 2860); prepare a spending and savings plan (step 2970); and monitor/review, revise and update any previously prepared assignments, worksheets, or tasks.

Other embodiments of the invention will be apparent to those skilled in the art from consideration of the specification and practice of the invention disclosed herein. For instance, the FBR database may be packaged and sold for use by users as software programmed on a computer disc, via the Internet or as course instructional software to support an online course or a printed textbook.

It is intended that the specification and examples be considered as exemplary only, with a true scope and spirit of the invention being indicated by the following claims.

What is claimed is:

1. A method for providing a faith-based financial plan, implemented via a computing device including a processor and a memory, the method comprising:
   receiving, from a user, user information comprising financial information and user-selected goals and values and user-selected weighting criteria, the user-selected weighting criteria defining quantitative levels of importance for one or more of user-selected goals and values;
   storing the user information in a database;
   compiling financial statements and reports for the user based on the financial information of the user;
   retrieving faith-based principles and faith-based financial management rules, based upon the financial statements and reports, from a faith-based rules database;
   generating, by way of a programmed computer, a behavior model to determine patterns of financial behaviors based upon the compiled financial statements and reports;
   extracting key financial behavior information from the behavior model;
   generating a behavior profile by comparing the key financial behavior information, the user-selected goals and values, the user-selected weighting criteria and the faith-based rules, the behavior profile identifies trends of financial usage, ranks priorities of financial usage, and assigns quantitative values to the financial usage to determine management of the user's finances in comparison to the user-selected goals and values and the user-selected weighting criteria according to the faith-based principles and the faith-based financial management rules;
   developing financial plans for the user based on results of the behavior profile;
   preparing a spending and savings plan for the user to facilitate the financial plans;
   analyzing, by way of the programmed computer, the behavior profile to identify targeted financial areas of improvements and targeted faith-based areas of improvement;
   generating faith-based categories based upon the targeted financial areas of improvements and the targeted faith-based areas of improvement, the faith-based categories comprise faith-based scriptures and faith-based examples;
   displaying on a display screen at least one of the financial statement and report, the behavior profile, the financial plans, the spending and saving plan, the targeted financial areas of improvement, the targeted faith-based areas of improvement, and the faith-based categories;

displaying on the display screen an update request to the user to revise, based upon the faith-based scriptures and faith-based examples of the faith-based categories, the steps of receiving, storing, compiling, retrieving, generating, extracting, developing and preparing the financial plans;

upon receiving the update request from the user, developing and preparing updated financial plans; and instructing the faith-based rules database, upon receipt of the update request, to conduct an analysis to determine how the targeted faith-based areas of improvement affect the targeted financial areas of improvement and including the analysis in the updated financial plans.

2. The method of claim 1, wherein the database collects and records information in a plurality of electronic data collection forms comprising at least one of:
   an Expense Record Log,
   a Weekly Spending Report,
   a Personal Vision Statement,
   a Debt Ledger,
   a Debt Tracker,
   a Savings Record,
   a Loan Transaction Ledger,
   a Goal Worksheet,
   a Priorities Worksheet,
   a Financial Planning Personal Goals and Priorities Worksheet,
   a Statement of Financial Position,
   a Cash Flow Statement,
   a Budget Ratio Analysis, and
   a Summary of Financial Findings.

3. The method of claim 1, further comprising:
   receiving, from the user, the user information comprising character information defining core values and characteristics of the user;
   assigning quantitative values to the character information;
   generating a characteristic profile, based upon the character information, to determine a life purposed plan for the user;
   employing a Stewardship Focus Financial Planning Process configured to determine whether the priorities and goals of the user are consistent and to devise a plan detailing targeted tasks to achieve the life purposed plan of the user.

4. A computer program product that can be directly loaded to the memory of a digital computer and which comprises software used to execute the steps of a method for providing a faith-based financial plan when the computer program is run on a computer, the method comprising:
   receiving, from a user, user information comprising financial information and user-selected goals and values and user-selected weighting criteria, the user-selected weighting criteria defining quantitative levels of importance for one or more of user-selected goals and values;
   storing the user information in a database;
   compiling financial statements and reports for the user based on the financial information of the user;
   retrieving faith-based principles and faith-based financial management rules, based upon the financial statements and reports, from a faith-based rules database;
   generating, by way of a programmed computer, a behavior model to determine patterns of financial behaviors based upon the compiled financial statements and reports;
   extracting key financial behavior information from the behavior model;
   generating a behavior profile by comparing the key financial behavior information, the user-selected goals and values, the user-selected weighting criteria and the faith-based rules, the behavior profile identifies trends of financial usage, ranks priorities of financial usage, and assigns quantitative values to the financial usage to determine management of the user's finances in comparison to the user-selected goals and values and the user-selected weighting criteria according to the faith-based principles and the faith-based financial management rules;
   developing financial plans for the user based on results of the behavior profile;
   preparing a spending and savings plan for the user to facilitate the financial plans;
   analyzing, by way of the programmed computer, the behavior profile to identify targeted financial areas of improvement and targeted faith-based areas of improvement;
   generating faith-based categories based upon the targeted financial areas of improvements and the targeted faith-based areas of improvements, the faith-based categories comprise faith-based scriptures and faith-based examples;
   displaying on a display screen at least one of the financial statement and report, the behavior profile, the financial plans, the spending and saving plan, the targeted financial areas of improvement, the targeted faith-based areas of improvement, and the faith-based categories;
   displaying on the display screen an update request to the user to revise, based upon the faith-based scriptures and faith-based examples of the faith-based categories, the steps of receiving, storing, compiling, retrieving, generating, extracting, developing and preparing the financial plans;
   upon receiving the update request from the user, developing and preparing updated financial plans; and
   instructing the faith-based rules database, upon receipt of the update request, to conduct an analysis to determine how the targeted faith-based areas of improvement affect the targeted financial areas of improvement and including the analysis in the updated financial plans.

5. The computer program product of claim 4, wherein database collects and records information in a plurality of electronic data collection forms comprising at least one of:
   an Expense Record Log,
   a Weekly Spending Report,
   a Personal Vision Statement,
   a Debt Ledger,
   a Debt Tracker,
   a Savings Record,
   a Loan Transaction Ledger,
   a Goal Worksheet,
   a Priorities Worksheet,
   a Financial Planning Personal Goals and Priorities Worksheet,
   a Statement of Financial Position,
   a Cash Flow Statement,
   a Budget Ratio Analysis, and
   a Summary of Financial Findings.

6. The computer program product of claim 1, further comprising:
   receiving, from the user, the user information comprising character information defining core values and characteristics of the user;

assigning quantitative values to the character information;
generating a characteristic profile, based upon the character information, to determine a life purposed plan for the user;
employing a Stewardship Focus Financial Planning Process configured to determine whether the priorities and goals of the user are consistent and to devise a plan detailing targeted tasks to achieve the life purposed plan of the user.

7. A system for providing a faith-based financial plan, comprising:
a processor, and
a memory coupled to the processor, wherein the memory comprises instructions that are executed by the processor to perform operations comprising:
receiving, from a user, user information comprising financial information and user-selected goals and values and user-selected weighting criteria, the user-selected weighting criteria defining quantitative levels of importance for one or more of user-selected goals and values;
storing the user information in a database;
compiling financial statements and reports for the user based on the financial information of the user;
retrieving faith-based principles and faith-based financial management rules, based upon the financial statements and reports, from a faith-based rules database;
generating, by way of a programmed computer, a behavior model to determine patterns of financial behaviors based upon the compiled financial statements and reports;
extracting key financial behavior information from the behavior model;
generating a behavior profile by comparing the key financial behavior information, the user-selected goals and values, the user-selected weighting criteria and the faith-based rules, the behavior profile identifies trends of financial usage, ranks priorities of financial usage, and assigns quantitative values to the financial usage to determine management of the user's finances in comparison to the user-selected goals and values and the user-selected weighting criteria according to the faith-based principles and the faith-based financial management rules;
developing financial plans for the user based on results of the behavior profile;
preparing a spending and savings plan for the user to facilitate the financial plans;
analyzing, by way of the programmed computer, the behavior profile to identify targeted financial areas of improvements and targeted faith-based areas of improvement;
generating faith-based categories based upon the targeted financial areas of improvements and the targeted faith-based areas of improvement, the faith-based categories comprise faith-based scriptures and faith-based examples;
displaying on a display screen at least one of the financial statement and report, the behavior profile, the financial plans, and the spending and saving plan, the targeted financial areas of improvement, the targeted faith-based areas of improvement, and the faith-based categories;
displaying on the display screen an update request to the user to revise, based upon the faith-based scriptures and the faith-based examples of the faith-based categories, the financial information to generate the behavior profile, financial statement and reports, financial plans, and spending and savings plan, the targeted financial areas of improvement, the targeted faith-based areas of improvement, and the faith-based categories;
upon receiving the update request from the user, developing and preparing updated financial plans; and
instructing the faith-based rules database, upon receipt of the update request, to conduct an analysis to determine how the targeted faith-based areas of improvement affect the targeted financial areas of improvement and including the analysis in the updated financial plans.

8. The system of claim 7, wherein the database collects and records information in at least one of a worksheet, a report, a test, an assignment, a quiz, a ledger, a questionnaire, and a financial statement.

9. The system of claim 8, wherein the database collects and records information in at least one of:
an Expense Record Log,
a Weekly Spending Report,
a Personal Vision Statement,
a Debt Ledger,
a Debt Tracker,
a Savings Record,
a Loan Transaction Ledger,
a Goal Worksheet,
a Priorities Worksheet,
a Financial Planning Personal Goals and Priorities Worksheet,
a Statement of Financial Position,
a Cash Flow Statement,
a Budget Ratio Analysis, and
a Summary of Financial Findings.

10. The system of claim 8, wherein the database collects and records information in:
an Expense Record Log,
a Weekly Spending Report,
a Personal Vision Statement,
a Debt Ledger,
a Debt Tracker,
a Savings Record,
a Loan Transaction Ledger,
a Goal Worksheet,
a Priorities Worksheet,
a Financial Planning Personal Goals and Priorities Worksheet,
a Statement of Financial Position,
a Cash Flow Statement,
a Budget Ratio Analysis, and
a Summary of Financial Findings.

11. The system of claim 9, further comprising:
determining whether financial matters of the user are consistent with principles of financial stewardship and faith-based teachings.

12. The system of claim 10, further comprising:
assessing and assigning quantitative values to character information of the user to determine the life purposed plan of the user.

13. The system of claim 12, further comprising identifying and displaying on the display screen corresponding passages within a faith-based text based on results of the step of assessing and assigning quantitative values to character information.

14. The system of claim 7, wherein the database stores faith-based rules dealing with money and tangible possessions as prescribed within a faith-based text.

15. The system of claim 14, further comprising:
receiving, from the user, the user information comprising character information defining core values and characteristics of the user;
assigning quantitative values to the character information;
generating a characteristic profile, based upon the character information, to determine a life purposed plan for the user;
employing a Stewardship Focus Financial Planning Process configured to determine whether the priorities and goals of the user are consistent and to devise a plan detailing targeted tasks to achieve the life purposed plan of the user.

16. The system of claim 15, wherein the database enables the user to assign a financial value to the tangible possessions that the user wishes to acquire and assign a financial value to goals that the user wishes to achieve or that relate to a lifestyle of the user.

17. The system of claim 9, wherein the Statement of Financial Position and the Cash Flow Statement are configured to identify and display on the display screen corresponding passages within a faith-based text that relate to financial stewardship practices of the user.

18. The system of claim 9, further comprising:
determining whether values, behaviors, and actions of the current financial life of the user are consistent with passages within a faith-based text.

19. The system of claim 18, wherein the faith-based categories of at least one of:
(a) Evaluating Earthly Economics,
(b) Reflecting True Values and Priorities,
(c) Disciplining Habits and Tendencies, and
(d) Confronting Attitudes and Motives.

20. The system of claim 19, further comprising:
evaluating an improvement of the faith-based categories for the user with respect to stewardship, by comparing financial, personal and faith-based matters of the user.

* * * * *